United States Patent
Liu et al.

(10) Patent No.: US 10,873,561 B2
(45) Date of Patent: Dec. 22, 2020

(54) METHOD AND APPARATUS FOR ALLOCATING IP PARAMETER

(71) Applicant: Huawei Technologies Co., Ltd., Shenzhen, Guangdong (CN)

(72) Inventors: Hai Liu, Shanghai (CN); Huan Li, Shanghai (CN); Wenruo Zhu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 335 days.

(21) Appl. No.: 15/136,421

(22) Filed: Apr. 22, 2016

(65) Prior Publication Data
US 2016/0241512 A1 Aug. 18, 2016

Related U.S. Application Data

(63) Continuation of application No. PCT/CN2013/085945, filed on Oct. 25, 2013.

(51) Int. Cl.
*H04L 29/12* (2006.01)
*H04W 8/26* (2009.01)

(52) U.S. Cl.
CPC .......... *H04L 61/2015* (2013.01); *H04W 8/26* (2013.01)

(58) Field of Classification Search
CPC .. H04L 61/2015; H04W 8/269; H04W 80/04; H04W 92/24
(Continued)

(56) References Cited

U.S. PATENT DOCUMENTS 9,392,636 B2 * 7/2016 Roeland ............... H04W 76/12
9,853,937 B1 * 12/2017 Sankaran ............. H04L 49/15
(Continued)

FOREIGN PATENT DOCUMENTS

| CN | 102124811 A | 7/2011 |
|---|---|---|
| CN | 103037343 A | 4/2013 |

(Continued)

OTHER PUBLICATIONS

D1: "Universal Mobile Telecommunications System (UMTS); LTE; Architecture enhancements for non-3GPP accesses", ETSI TS 123. 402 V10.4.0 (Jun. 2011), http://www.etsi.org/deliver/etsi_ts/123400_123499/123402/10.04.00_60/ts_123402v100400p.pdf.*

(Continued)

*Primary Examiner* — Douglas B Blair
*Assistant Examiner* — Patrick F Ngankam
(74) *Attorney, Agent, or Firm* — Leydig, Voit & Mayer, Ltd.

(57) ABSTRACT

The present invention discloses a method and an apparatus for allocating an Internet Protocol (IP) parameter. Deployment of a dynamic host configuration protocol (DHCP) server may be determined according to a received DHCP server indication, so as to allocate an IP parameter of user equipment (UE). The DHCP server indication may indicate whether a data packet network gateway (P-GW) serves as the DHCP server, so that specific deployment of the DHCP server may be determined, and the P-GW and a trusted WLAN access gateway (TWAG) are compatible with the UE, ensuring that the UE can receive an IP parameter allocated by the P-GW, and improving accuracy of allocating the IP parameter.

8 Claims, 11 Drawing Sheets

(58) Field of Classification Search
USPC .......................................................... 709/245
See application file for complete search history.

(56) References Cited

U.S. PATENT DOCUMENTS

| | | |
|---|---|---|
| 2013/0058278 A1 | 3/2013 | Nishida et al. |
| 2014/0341138 A1* | 11/2014 | Roeland .............. H04W 80/045 370/329 |
| 2015/0113171 A1 | 4/2015 | Choi et al. |

FOREIGN PATENT DOCUMENTS

| | | | |
|---|---|---|---|
| CN | 103298148 | * | 6/2013 |
| CN | 103298148 A | | 9/2013 |
| CN | 103369626 A | | 10/2013 |
| WO | WO 2011/125883 A1 | | 10/2011 |
| WO | WO-2014005267 A1 * | 1/2014 | ............ H04W 12/06 |

OTHER PUBLICATIONS

D2: "3rd Generation Partnership Project; Technical Specification Group Core Network and Terminals; Interworking between the Public Land Mobile Network (PLMN) supporting packet based services and Packet Data Networks (PDN)", 3GPP TS 29.061 V9.3.0 (Jun. 2010), http://www.qtc.jp/3GPP/Specs/29061-930.pdf.*

RFC 7618 "Dynamic Allocation of Shared IPv4 Addresses", Aug. 2015, https://tools.ietf.org/html/rfc7618.*

ETSI "Universal Mobile Telecommunications System (UMTS); LTE; Architecture enhancements for non-3GPP accesses", https://www.etsi.org/deliver/etsi_ts/123400_123499/123402/10.04.00_60/ts_123402v100400p.pdf (Year: 2011).*

D2: 3rd Generation Partnership Project; Technical Specification Group Core Network and Terminals; Interworking between the Public Land Mobile Network (PLMN) supporting packet based services and Packet Data Networks (PDN), http://www.qtc.jp/3GPP/Specs/29061-930.pdf (Year: 2010).*

ETSI "Universal Mobile Telecommunications System (UMTS); LTE; Architecture enhancements for non-3GPP accesses" (Year: 2011).*

"3rd Generation Partnership Project; Technical Specification Group Core Network and Terminals; Proxy Mobile IPv6 (PMIPv6) based Mobility and Tunnelling protocols; Stage 3 (Release 12)", 3GPP TS 29.275 V12.0.0, Sep. 2013, 88 pages.

"3rd Generation Partnership Project; Technical Specification Group Services and System Aspects; Architecture enhancements for non-3GPP accesses (Release 12)", 3GPP TS 23.402 v12.2.0, Sep. 2013, 256 pages.

"3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)", 3GPP TS 29.274 V12.2.0, Sep. 2013, 230 pages.

* cited by examiner

METHOD AND APPARATUS FOR ALLOCATING IP PARAMETER

CROSS-REFERENCE TO RELATED APPLICATIONS

This application is a continuation of International Patent Application No. PCT/CN2013/085945, filed on Oct. 25, 2013, which is hereby incorporated by reference in its entirety.

TECHNICAL FIELD

The present invention relates to the field of wireless communications, and in particular, to a method and an apparatus for allocating an IP parameter.

BACKGROUND

An evolved packet core (EPC) is constituted of an MME (mobility management entity), a PDN gateway (P-GW, packet data network gateway), and the like, where the P-GW is a gateway that terminates an SGi interface oriented to a PDN. The EPC supports multiple wireless access technologies. If an EPC network considers WLAN (wireless local area network) access as trusted access, UE (user equipment) does not need to establish IPSec (Internet Protocol security) between the terminal and the network and may access the EPC by using the P-GW. A WLAN accesses the EPC, and then the core network may include: a TWAG (trusted WLAN access gateway), an AAA (Authentication, Authorization, Accounting) server, a TWAP (trusted WLAN AAA proxy), the P-GW, and the like.

In the prior art, for different UE, a DHCP (dynamic host configuration protocol) server may be deployed in a TWAG or a P-GW. When the DHCP server is deployed in the TWAG, the P-GW always delivers an IP (Internet Protocol) address and an IP parameter to user equipment; when DHCP is deployed in the P-GW, the P-GW delivers, to the user equipment only when the P-GW receives a DHCP request, an IP address and an IP parameter that are allocated for the user equipment. However, in the prior art, the TWAG and the P-GW cannot acquire deployment of the DHCP server, leading to discordance between the TWAG and the P-GW in delivering an IP address and an IP parameter, and causing a problem of incompatibility between the TWAG or the P-GW and the UE, so that the user equipment cannot receive the IP address and the IP parameter.

SUMMARY

Embodiments of the present invention provide a method, an apparatus, and a system for allocating an IP address and an IP parameter, which are used to resolve a technical problem in the prior art that a TWAG and a P-GW cannot acquire deployment of a DHCP server, leading to discordance between the TWAG and the P-GW in delivering an IP address and an IP parameter, and causing a problem of incompatibility between the TWAG or the P-GW and UE, so that the user equipment cannot receive the IP address and the IP parameter.

To resolve the foregoing technical problem, a first aspect of the embodiments of the present invention provides a method for allocating an IP address and an IP parameter, including:

receiving, by a P-GW, a DHCP server indication sent by a TWAG, where the DHCP server indication is used to indicate whether the P-GW serves as a DHCP server; and allocating, by the P-GW, an IP address and an IP parameter of user equipment according to the DHCP server indication.

In a first possible implementation manner of the first aspect, the DHCP server indication includes: a parameter that is negotiated among the user equipment, a TWAP, and an AAA server and that indicates whether the P-GW serves as the DHCP server.

With reference to the first possible implementation manner of the first aspect, in a second possible implementation manner of the first aspect, the DHCP server indication includes:

a parameter sent by the TWAP to the TWAG.

In a third possible implementation manner of the first aspect, the DHCP server indication includes: a parameter that is sent by the user equipment to the TWAG and that is used to indicate whether the P-GW serves as the DHCP server.

With reference to the first aspect and any one or more of the first, the second, and the third possible implementation manners of the first aspect, in a fourth possible implementation manner of the first aspect, the allocating, by the P-GW, an IP address and an IP parameter of user equipment according to the DHCP server indication includes:

if the DHCP server indication indicates that the P-GW serves as the DHCP server, when a DHCP request message sent by the user equipment is received, sending, by the P-GW to the user equipment, a DHCP response message corresponding to the DHCP request message, where the DHCP response message carries the IP address and the IP parameter of the user equipment that are allocated by the P-GW; or if the DHCP server indication indicates that the P-GW does not serve as the DHCP server, when a Create Session Request sent by the TWAG is received, sending, by the P-GW to the TWAG, a Create Session Response corresponding to the Create Session Request, where the Create Session Response carries the IP address and the IP parameter of the user equipment that are allocated by the P-GW, so that the TWAG serves as the DHCP server to send the IP address and the IP parameter to the user equipment.

Correspondingly, a second aspect of the embodiments of the present invention further provides a method for allocating an IP address and an IP parameter, including:

receiving, by a TWAG, a DHCP server indication, where the DHCP server indication is used to indicate whether the TWAG serves as a DHCP server;

if the DHCP server indication indicates that the TWAG serves as the DHCP server, when a DHCP request message sent by the user equipment is received, sending, by the TWAG to the user equipment by using a DHCP response message corresponding to the DHCP request message, an IP address and an IP parameter of the user equipment that are delivered by a P-GW in advance; and if the DHCP server indication indicates that the TWAG does not serve as the DHCP server, sending, by the TWAG to the P-GW, the DHCP message sent by the user equipment, so that the P-GW sends the IP address and the IP parameter of the user equipment to the TWAG by using the DHCP response message corresponding to the DHCP request message, and the TWAG sends, to the user equipment, the DHCP response message carrying the IP address and the IP parameter of the user equipment.

In a first possible implementation manner of the second aspect, the DHCP server indication includes:

a parameter that is negotiated among the user equipment, a TWAP, and an AAA server and that indicates whether the TWAG serves as the DHCP server.

With reference to the first possible implementation manner of the second aspect, in a second possible implementation manner of the second aspect, the receiving, by a TWAG, a DHCP server indication includes:

receiving, by the TWAG, a DHCP server indication sent by the TWAP.

In a third possible implementation manner of the second aspect, the DHCP server indication includes: a parameter that is sent by the user equipment to the TWAG and that is used to indicate whether the TWAG serves as the DHCP server.

Correspondingly, a third aspect of the embodiments of the present invention further provides an apparatus for allocating an IP address and an IP parameter, including:

a receiving module, configured to receive a DHCP server indication sent by a TWAG, where the DHCP server indication is used to indicate whether the P-GW serves as a DHCP server; and an allocating module, configured to allocate an IP address and an IP parameter of user equipment according to the DHCP server indication received by the receiving module.

In a first possible implementation manner of the third aspect, the DHCP server indication includes: a parameter that is negotiated among the user equipment, a TWAP, and an AAA server and that indicates whether the P-GW serves as the DHCP server.

With reference to the first possible implementation manner of the third aspect, in a second possible implementation manner of the third aspect, the DHCP server indication includes: a parameter sent by the TWAP to the TWAG.

In a third possible implementation manner of the third aspect, the DHCP server indication includes: a parameter that is sent by the user equipment to the TWAG and that is used to indicate whether the P-GW serves as the DHCP server.

With reference to the third aspect and any one or more of the first, the second, and the third possible implementation manners of the third aspect, in a fourth possible implementation manner of the third aspect, the allocating module includes: a first allocating unit or a second allocating unit, where the first allocating unit is configured to: if the DHCP server indication indicates that the P-GW serves as the DHCP server, when a DHCP request message sent by the user equipment is received, send, to the user equipment, a DHCP response message corresponding to the DHCP request message, where the DHCP response message carries the IP address and the IP parameter of the user equipment that are allocated by the P-GW; and the second allocating unit is configured to: if the DHCP server indication indicates that the P-GW does not serve as the DHCP server, when a Create Session Request sent by the TWAG is received, send, to the TWAG, a Create Session Response corresponding to the Create Session Request, where the Create Session Response carries the IP address and the IP parameter of the user equipment that are allocated by the P-GW, so that the TWAG serves as the DHCP server to send the IP address and the IP parameter to the user equipment.

Correspondingly, a fourth aspect of the embodiments of the present invention further provides an apparatus for allocating an IP address and an IP parameter, including:

a receiving module, configured to receive a DHCP server indication, where the DHCP server indication is used to indicate whether the TWAG serves as a DHCP server;

a first processing module, configured to: if the DHCP server indication indicates that the TWAG serves as the DHCP server, when a DHCP request message sent by the user equipment is received, send, to the user equipment by using a DHCP response message corresponding to the DHCP request message, an IP address and an IP parameter of the user equipment that are delivered by a P-GW in advance; and a second processing module, configured to: if the DHCP server indication indicates that the TWAG does not serve as the DHCP server, send, to the P-GW, the DHCP message sent by the user equipment, so that the P-GW sends the IP address and the IP parameter of the user equipment to the TWAG by using the DHCP response message corresponding to the DHCP request message, and the TWAG sends, to the user equipment, the DHCP response message carrying the IP address and the IP parameter of the user equipment.

In a first possible implementation manner of the fourth aspect, the DHCP server indication includes:

a parameter that is negotiated among the user equipment, a TWAP, and an AAA server and that indicates whether the TWAG serves as the DHCP server.

With reference to the first possible implementation manner of the fourth aspect, in a second possible implementation manner of the first aspect, the receiving module is specifically configured to:

receive a DHCP server indication sent by the TWAP.

In a third possible implementation manner of the fourth aspect, the DHCP server indication includes:

a parameter that is sent by the user equipment to the TWAG and that is used to indicate whether the TWAG serves as the DHCP server.

Correspondingly, a fifth aspect of the embodiments of the present invention further provides a system for allocating an IP address and an IP parameter, including: a TWAG and a P-GW, where the P-GW is the apparatus described in the third aspect and any one of the first, the second, the third, and the fourth possible implementation manners of the third aspect, and the TWAG is the apparatus described in the fourth aspect and any one of the first, the second, and the third possible implementation manners of the fourth aspect.

According to the embodiments of the present invention, deployment of DHCP may be determined according to a received DHCP server indication, so as to allocate an IP address and an IP parameter of user equipment, where the DHCP server indication is used to indicate whether a P-GW serves as a DHCP server or whether a TWAG serves as the DHCP server, so that specific deployment of the DHCP server may be determined, which resolves a technical problem in the prior art that the TWAG and the P-GW cannot acquire the deployment of the DHCP server, leading to discordance between the TWAG and the P-GW in delivering an IP address and an IP parameter, and causing a problem of incompatibility between the TWAG or the P-GW and the UE, so that the user equipment cannot receive the IP address and the IP parameter. Therefore, the P-GW and the TWAG are compatible with the UE, ensuring that the user equipment can receive an IP address and an IP parameter that are allocated by the P-GW, and improving accuracy of allocating the IP address and the IP parameter.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Embodiments of the present invention provide a method, an apparatus, and a system for allocating an IP address and an IP parameter. Specifically, an evolved packet system EPS is constituted of three parts: an EPC, a base station, and UE, where the base station is responsible for an access network part, the UE is a user terminal device, and the core network EPC is constituted of an MME, a P-GW, and the like, where the P-GW is a gateway that terminates an SGi interface oriented to a PDN.

The EPC supports multiple wireless access technologies, and a WLAN may access the EPC. The core network in the embodiments of the present invention may include: a TWAG, an AAA server, a TWAP, the P-GW, and the like. The AAA server is used for authentication, authorization, and accounting, and manages user equipment that may access a network server. A DHCP server indication is a parameter that is negotiated among the user equipment, the TWAP, and the AAA server and that indicates whether the P-GW serves as a DHCP server. For different user equipment, the DHCP server indication is different, and therefore the user equipment, the TWAP, and the AAA server all can acquire the DHCP server indication.

In the embodiments of the present invention, a P-GW may allocate an IP address and an IP parameter of user equipment according to a received DHCP server indication, where the DHCP server indication is used to indicate whether the P-GW serves as a DHCP server, so that specific deployment of the DHCP server may be determined, which resolves a technical problem in the prior art that a TWAG and the P-GW cannot acquire the deployment of the DHCP server, leading to discordance between the TWAG and the P-GW in delivering an IP address and an IP parameter, and causing a problem of incompatibility between the TWAG or the P-GW and the UE, so that the user equipment cannot receive the IP address and the IP parameter. Therefore, the P-GW and the TWAG are compatible with the UE, ensuring that the user equipment can receive the IP address and the IP parameter that are allocated by the P-GW, and improving accuracy of allocating the IP address and the IP parameter. The following uses specific embodiments for illustration.

Figure 1:
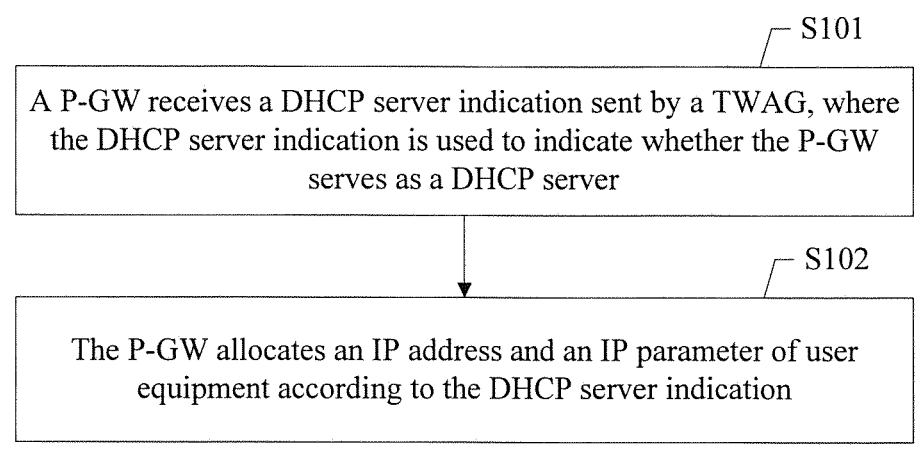
FIG. 1 is a flowchart of a method for allocating an IP address and an IP parameter according to a first embodiment of the present invention.

Referring to FIG. 1, FIG. 1 is a flowchart of a method for allocating an IP address and an IP parameter according to a first embodiment of the present invention. This embodiment of the present invention may be implemented in a packet data network gateway P-GW. As shown in the figure, a procedure in this embodiment includes the following steps: S101-S102.

S101. The P-GW receives a DHCP server indication sent by a TWAG, where the DHCP server indication is used to indicate whether the P-GW serves as a DHCP server.

S102. The P-GW allocates an IP address and an IP parameter of user equipment according to the DHCP server indication.

As an optional implementation manner, in step S101, the DHCP server indication may include: a parameter that is negotiated among the user equipment, a TWAP, and an AAA server and that indicates whether the P-GW serves as the DHCP server. Specifically, the DHCP server indication may be a parameter sent by the TWAP to the TWAG. The TWAG sends the DHCP server indication to the P-GW, and the P-GW receives the DHCP server indication sent by the TWAG.

Further optionally, a Create Session Request sent by the TWAG to the P-GW may carry the DHCP server indication, so that the TWAG sends the DHCP server indication to the P-GW.

As an optional implementation manner, in step S101, the DHCP server indication may further include: a parameter that is sent by the user equipment to the TWAG and that is used to indicate whether the P-GW serves as the DHCP server. Specifically, the parameter may include an APN (access point name) parameter or a PDP (Packet Data Protocol) parameter. Optionally, the user equipment may send the DHCP server indication to a TWAP, and the TWAP sends the DHCP server indication to the TWAG after receiving the DHCP server indication; or the user equipment directly sends the DHCP server indication to the TWAG.

Further optionally, the PDP parameter may include: an activate PDP context message. Specifically, the user equipment may send the activate PDP context message to the TWAG, so that the TWAG determines, according to the received activate PDP context message, whether the P-GW serves as the DHCP server.

Further optionally, the APN parameter may include an APN message sent by the user equipment to the TWAG, where the APN message indicates which APN is specifically selected by the user equipment. The TWAG determines, according to the received APN message, whether the P-GW serves as the DHCP server.

As an optional implementation manner, in step S102, after receiving the DHCP server indication, the P-GW reads the DHCP server indication, and determines whether the P-GW serves as the DHCP server, so as to allocate the IP address and the IP parameter of the user equipment according to the DHCP server indication. The IP address may include: a specific IPv4 (Internet Protocol version 4) address, an IPv6 (Internet Protocol version 6) prefix, and the like. The IP parameter may include: a DNS (domain name system) address, a P-CSCF (proxy-call session control function) address, and the like.

Further optionally, if the DHCP server indication indicates that the P-GW serves as the DHCP server, when a DHCP request message sent by the user equipment is received, the P-GW sends, to the user equipment, a DHCP response message corresponding to the DHCP request message, where the DHCP response message carries the IP address and the IP parameter of the user equipment that are allocated by the P-GW.

Further optionally, if the DHCP server indication indicates that the P-GW does not serve as the DHCP server, when a Create Session Request sent by the TWAG is received, the P-GW sends, to the TWAG, a Create Session Response corresponding to the Create Session Request, where the Create Session Response carries the IP address and the IP parameter of the user equipment that are allocated by the P-GW, so that the TWAG serves as the DHCP server to send the IP address and the IP parameter to the user equipment.

As an optional implementation manner, the DHCP server indication may further include: a parameter that is sent by the user equipment to the TWAG and that is used to indicate whether the P-GW serves as the DHCP server, where the parameter may include an APN parameter or a PDP parameter. If the TWAG receives the APN parameter or the PDP parameter sent by the user equipment, it can be determined that the P-GW serves as the DHCP server. Specifically, the PDP parameter may include an activate PDP context message, and the APN parameter may include an APN message sent by the user equipment to the P-GW.

Further optionally, the DHCP server indication may further include: a parameter that is sent by the user equipment to the P-GW and that is used to indicate whether the P-GW serves as the DHCP server. Specifically, the parameter may include a PCO (protocol configuration options) parameter. The P-GW receives the PCO parameter sent by the user equipment, and then it can be determined that the P-GW serves as the DHCP server. The P-GW allocates the IP address and the IP parameter of the user equipment according to the DHCP server indication, and adds the IP address and the IP parameter of the user equipment to a DHCP response message, so as to deliver the IP address and the IP parameter of the user equipment to the user equipment.

Further optionally, the TWAG receives a DHCP server indication sent by a TWAP, where the DHCP server indication may include: a parameter that is negotiated among the user equipment, the TWAP, and an AAA server and that indicates whether the P-GW serves as the DHCP server. The TWAG reads the DHCP server indication and controls not to send the DHCP server indication to the P-GW, that is, the TWAG acquires the DHCP server indication, but the P-GW does not acquire the DHCP server indication. Therefore, the TWAG knows whether the P-GW serves as the DHCP server, but the P-GW does not know whether the P-GW serves as the DHCP server.

Further optionally, if the DHCP server indication indicates that the P-GW does not serve as the DHCP server, the TWAG may determine, according to the DHCP server indication, that the P-GW does not serve as the DHCP server, instead the TWAG serves as the DHCP server. If a DHCP request message sent by the user equipment is received, the TWAG acquires the IP address and the IP parameter from a configuration parameter delivered by the P-GW in advance, where the configuration parameter delivered by the P-GW in advance may include: the IP address and an APCO (additional protocol configuration options) parameter, where the APCO parameter includes the IP parameter. The TWAG sends, to the user equipment, a DHCP response message corresponding to the DHCP request message, where the DHCP response message carries the IP address and the IP parameter that are acquired by the TWAG.

Further optionally, if the DHCP server indication indicates that the P-GW serves as the DHCP server, the TWAG sends a Create Session Request to the P-GW, and the P-GW sends, to the TWAG, a Create Session Response corresponding to the Create Session Request, where the Create Session Response does not carry the IP address and the IP parameter of the user equipment that are allocated by the P-GW. When the user equipment sends the DHCP request message to the TWAG, the TWAG sends the DHCP request message to the P-GW. The P-GW receives the DHCP request message and the P-GW sends, to the TWAG, the DHCP response message corresponding to the DHCP request message, where the DHCP response message carries the IP address and the IP parameter of the user equipment that are allocated by the P-GW. The TWAG receives the DHCP response message, and sends the DHCP response message to the user equipment, where the DHCP response message carries the IP address and the IP parameter of the user equipment that are allocated by the P-GW.

In another embodiment, implementation methods of a DHCP server indication are diverse, which may be a parameter that is negotiated among UE, a TWAP, and an AAA server and that indicates whether a P-GW serves as a DHCP server, or may be a parameter that is sent by the UE to a TWAG and that indicates whether the P-GW serves as the DHCP server, or may be another implementation form, which is not specifically limited in this embodiment.

This embodiment of the present invention provides a method for allocating an IP address and an IP parameter. A P-GW may allocate an IP address and an IP parameter of user equipment according to a received DHCP server indication, where the DHCP server indication is used to indicate whether the P-GW serves as a DHCP server, so that specific deployment of the DHCP server may be determined, which resolves a technical problem in the prior art that a TWAG and the P-GW cannot acquire the deployment of the DHCP server, leading to discordance between the TWAG and the P-GW in delivering an IP address and an IP parameter, and causing a problem of incompatibility between the TWAG or the P-GW and the UE, so that the user equipment cannot receive the IP address and the IP parameter. Therefore, the P-GW and the TWAG are compatible with the UE, ensuring that the user equipment can receive the IP address and the IP parameter that are allocated by the P-GW, and improving accuracy of allocating the IP address and the IP parameter.

Figure 2:
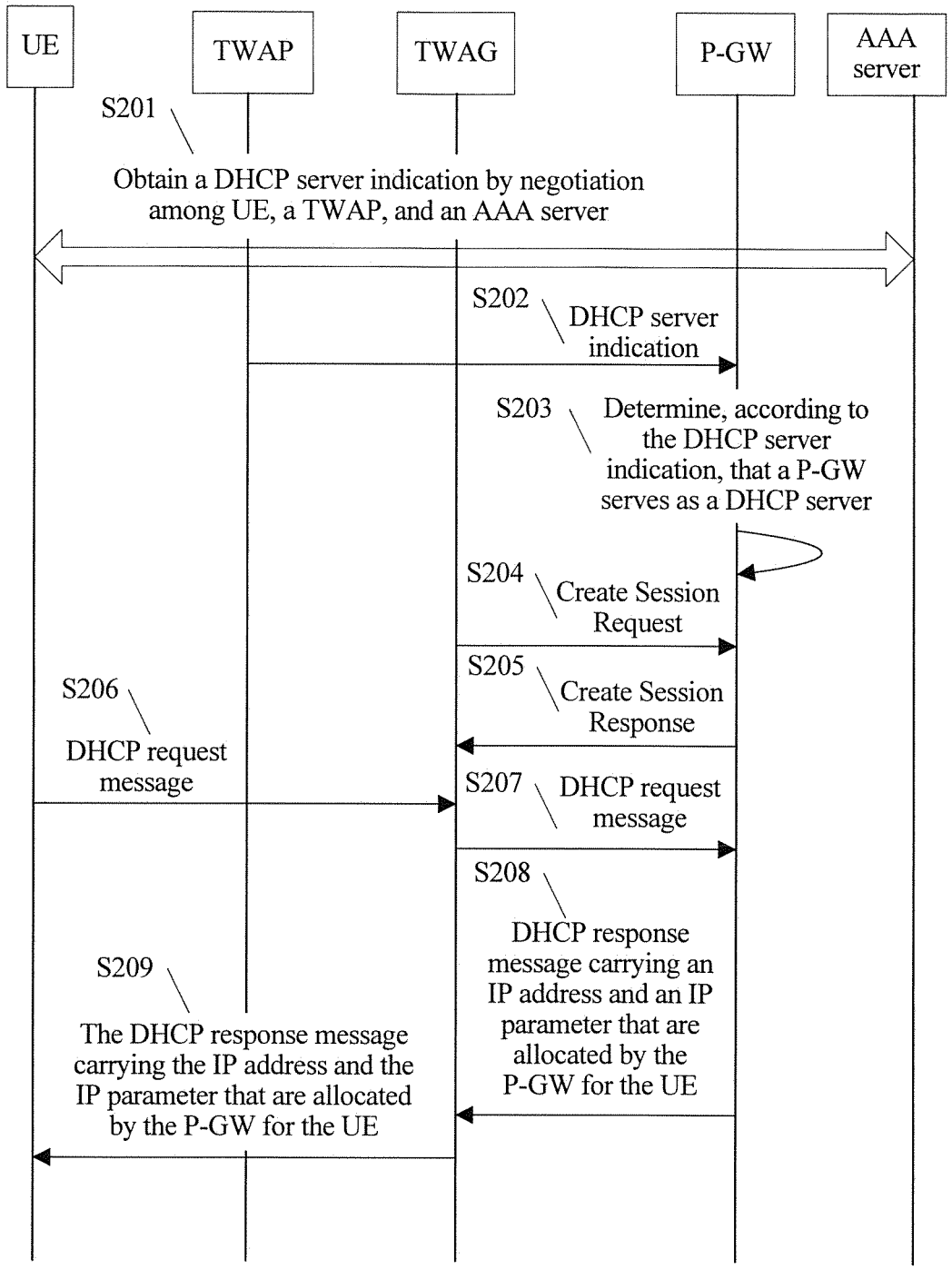
FIG. 2 is a flowchart of a method for allocating an IP address and an IP parameter according to a second embodiment of the present invention.

FIG. 2 is a flowchart of a method for allocating an IP address and an IP parameter according to a second embodiment of the present invention. As shown in the figure, a procedure in this embodiment includes the following steps: S201-S209.

S201. Obtain a DHCP server indication by negotiation among UE, a TWAP, and an AAA server.

As an optional implementation manner, the DHCP server indication is used to indicate whether a P-GW serves as a DHCP server.

S202. The TWAP sends the DHCP server indication to a P-GW.

S203. The P-GW determines, according to the DHCP server indication, that the P-GW serves as a DHCP server.

S204. A TWAG sends a Create Session Request to the P-GW.

S205. The P-GW returns a Create Session Response to the TWAG.

S206. The UE sends a DHCP request message to the TWAG.

S207. The TWAG sends the DHCP request message to the P-GW according to the DHCP server indication.

S208. The P-GW sends a DHCP response message to the TWAG, where the DHCP response message carries an IP address and an IP parameter that are allocated by the P-GW for the UE.

As an optional implementation manner, the IP address may include: a specific IP address, an IP prefix, an address range, or an address set. The IP parameter may include: a DNS address and the like.

S209. The TWAG sends the DHCP response message to the UE, where the DHCP response message carries the IP address and the IP parameter that are allocated by the P-GW for the UE.

This embodiment of the present invention provides a method for allocating an IP address and an IP parameter. A P-GW may allocate an IP address and an IP parameter of user equipment according to a received DHCP server indication, where the DHCP server indication indicates that the P-GW serves as a DHCP server, and the P-GW may send a DHCP response message to the user equipment, where the DHCP response message carries the IP address and the IP parameter of the user equipment that are allocated by the P-GW, which resolves a technical problem in the prior art that a TWAG and the P-GW cannot acquire deployment of the DHCP server, leading to discordance between the TWAG and the P-GW in delivering an IP address and an IP parameter, and causing a problem of incompatibility between the TWAG or the P-GW and the UE, so that the user equipment cannot receive the IP address and the IP parameter. Therefore, the P-GW and the TWAG are compatible with the UE, ensuring that the user equipment can receive the IP address and the IP parameter that are allocated by the P-GW, and improving accuracy of allocating the IP address and the IP parameter.

Figure 3:
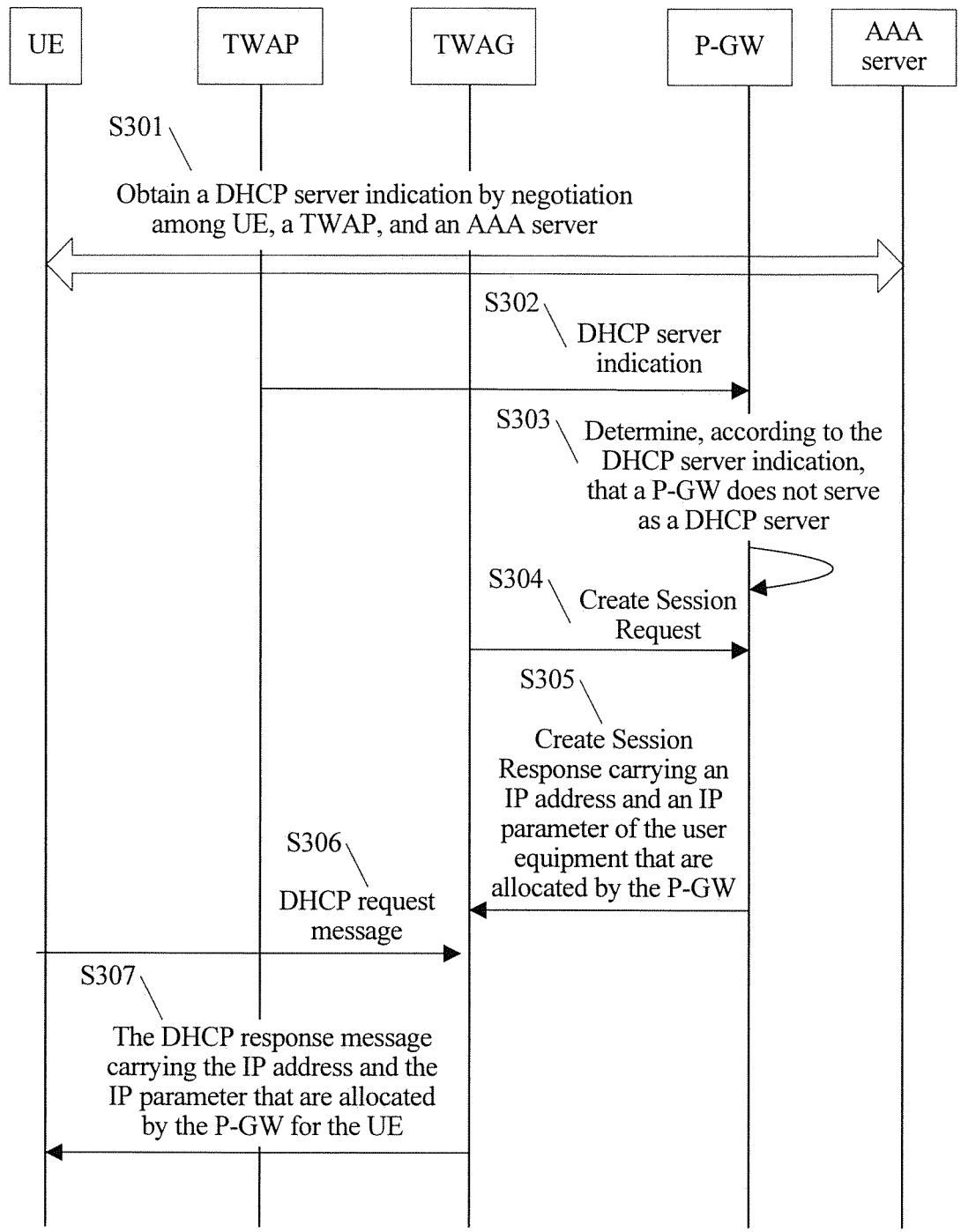
FIG. 3 is a flowchart of a method for allocating an IP address and an IP parameter according to a third embodiment of the present invention.

FIG. 3 is a flowchart of a method for allocating an IP address and an IP parameter according to a third embodiment of the present invention. As shown in the figure, a procedure in this embodiment includes the following steps: S301-S307.

S301. Obtain a DHCP server indication by negotiation among UE, a TWAP, and an AAA server.

As an optional implementation manner, the DHCP server indication is used to indicate whether a P-GW serves as a DHCP server.

S302. The TWAP sends the DHCP server indication to a P-GW.

S303. The P-GW determines, according to the DHCP server indication, that the P-GW does not serve as a DHCP server.

S304. A TWAG sends a Create Session Request to the P-GW.

S305. The P-GW sends, to the TWAG, a Create Session Response corresponding to the Create Session Request, where the Create Session Response carries an IP address and an IP parameter of the user equipment that are allocated by the P-GW.

S306. The UE sends a DHCP request message to the TWAG.

S307. The TWAG serves as the DHCP server to return a DHCP response message to the UE, where the DHCP response message carries the IP address and the IP parameter that are allocated by the P-GW for the UE.

This embodiment of the present invention provides a method for allocating an IP address and an IP parameter. A P-GW may allocate an IP address and an IP parameter of user equipment according to a received DHCP server indication, where the DHCP server indication indicates that the P-GW does not serve as a DHCP server, and the P-GW may send a Create Session Response to the user equipment, where the Create Session Response carries the IP address and the IP parameter of the user equipment that are allocated by the P-GW, which resolves a technical problem in the prior art that a TWAG and the P-GW cannot acquire deployment of the DHCP server, leading to discordance between the TWAG and the P-GW in delivering an IP address and an IP parameter, and causing a problem of incompatibility between the TWAG or the P-GW and the UE, so that the user equipment cannot receive the IP address and the IP parameter. Therefore, the P-GW and the TWAG are compatible with the UE, ensuring that the user equipment can receive the IP address and the IP parameter that are allocated by the P-GW, and improving accuracy of allocating the IP address and the IP parameter.

Figure 4:
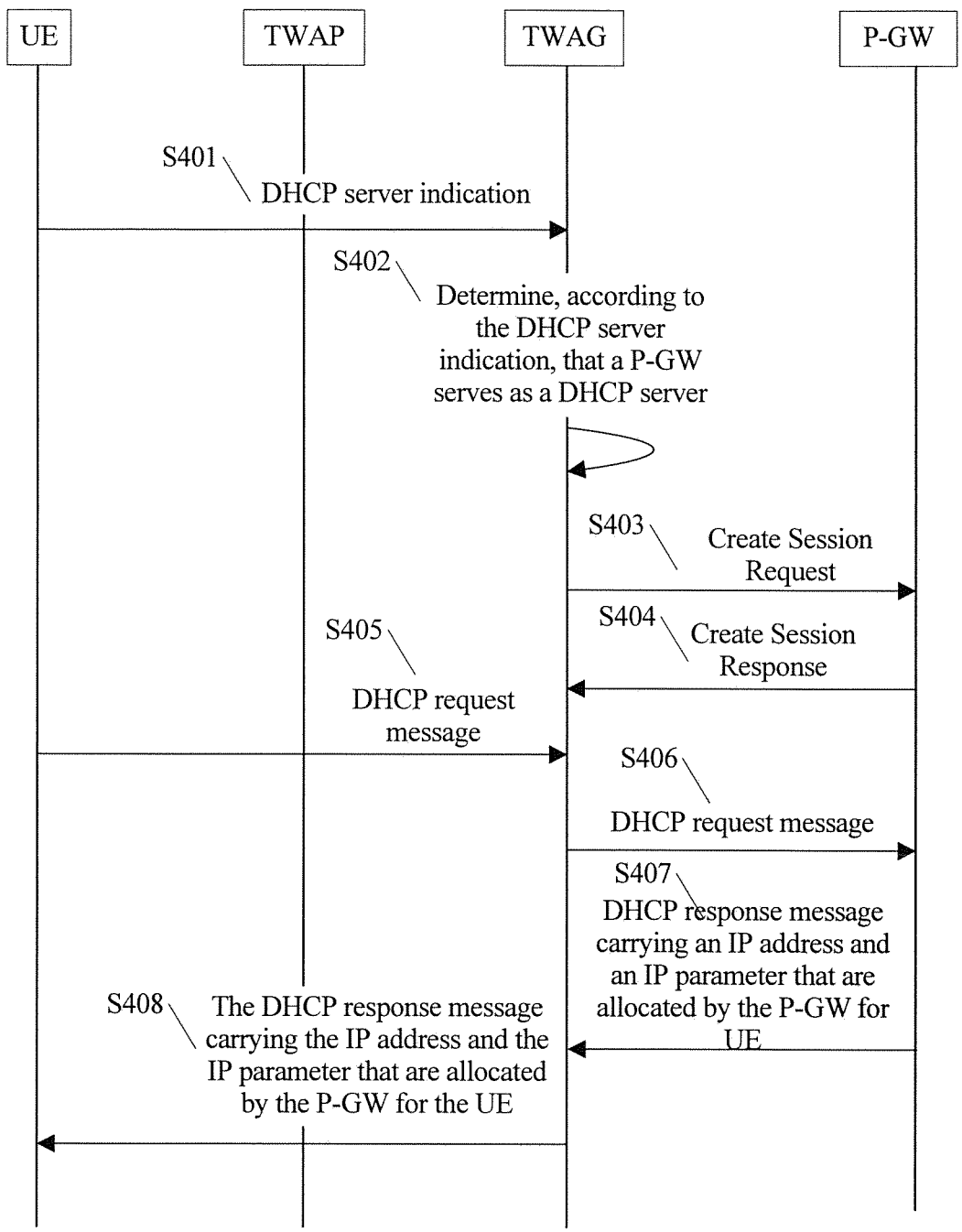
FIG. 4 is a flowchart of a method for allocating an IP address and an IP parameter according to a fourth embodiment of the present invention.

FIG. 4 is a flowchart of a method for allocating an IP address and an IP parameter according to a fourth embodiment of the present invention. As shown in the figure, a procedure in this embodiment includes the following steps: S401-S408.

S401. UE sends a DHCP server indication to a TWAG.

As an optional implementation manner, the DHCP server indication may include: a parameter that is sent by the user equipment to the TWAG and that is used to indicate whether a P-GW serves as a DHCP server. Specifically, the parameter may include an APN parameter or a PDP parameter.

Optionally, the user equipment may send the DHCP server indication to a TWAP, and the TWAP sends the DHCP server indication to the TWAG after receiving the DHCP server indication; or the user equipment directly sends the DHCP server indication to the TWAG.

Further optionally, the PDP parameter may include: an activate PDP context message. Specifically, the user equipment may send the activate PDP context message to the TWAG, so that the TWAG determines, according to the received activate PDP context message, whether the P-GW serves as the DHCP server.

Further optionally, the APN parameter may include an APN message sent by the user equipment to the TWAG, where the APN message indicates which APN is specifically selected by the user equipment. The TWAG determines, according to the received APN message, whether the P-GW serves as the DHCP server.

S402. The TWAG determines, according to the DHCP server indication, that a P-GW serves as a DHCP server.

As an optional implementation manner, the DHCP server indication may further include: a parameter that is sent by the user equipment to the TWAG and that is used to indicate whether the P-GW serves as the DHCP server, where the parameter may include an APN parameter or a PDP parameter. If the TWAG receives the APN parameter or the PDP parameter sent by the user equipment, it can be determined that the P-GW serves as the DHCP server. Specifically, the PDP parameter may include an activate PDP context message, and the APN parameter may include an APN message sent by the user equipment to the TWAG.

S403. The TWAG sends a Create Session Request to the P-GW.

S404. The P-GW returns a Create Session Response to the TWAG.

S405. The UE sends a DHCP request message to the TWAG.

S406. The TWAG sends the DHCP request message to the P-GW according to the DHCP server indication.

S407. The P-GW sends a DHCP response message to the TWAG, where the DHCP response message carries an IP address and an IP parameter that are allocated by the P-GW for the UE.

S408. The TWAG sends the DHCP response message to the UE, where the DHCP response message carries the IP address and the IP parameter that are allocated by the P-GW for the UE.

This embodiment of the present invention provides a method for allocating an IP address and an IP parameter. A TWAG may determine, according to a DHCP server indication sent by UE, that a P-GW serves as a DHCP server, and the P-GW may send a DHCP response message to the user equipment, where the DHCP response message carries an IP address and an IP parameter of the user equipment that are allocated by the P-GW, which resolves a technical problem in the prior art that the TWAG and the P-GW cannot acquire deployment of the DHCP server, leading to discordance between the TWAG and the P-GW in delivering an IP address and an IP parameter, and causing a problem of incompatibility between the TWAG or the P-GW and the UE, so that the user equipment cannot receive the IP address and the IP parameter. Therefore, the P-GW and the TWAG are compatible with the UE, ensuring that the user equipment can receive the IP address and the IP parameter that are allocated by the P-GW, and improving accuracy of allocating the IP address and the IP parameter.

Figure 5:
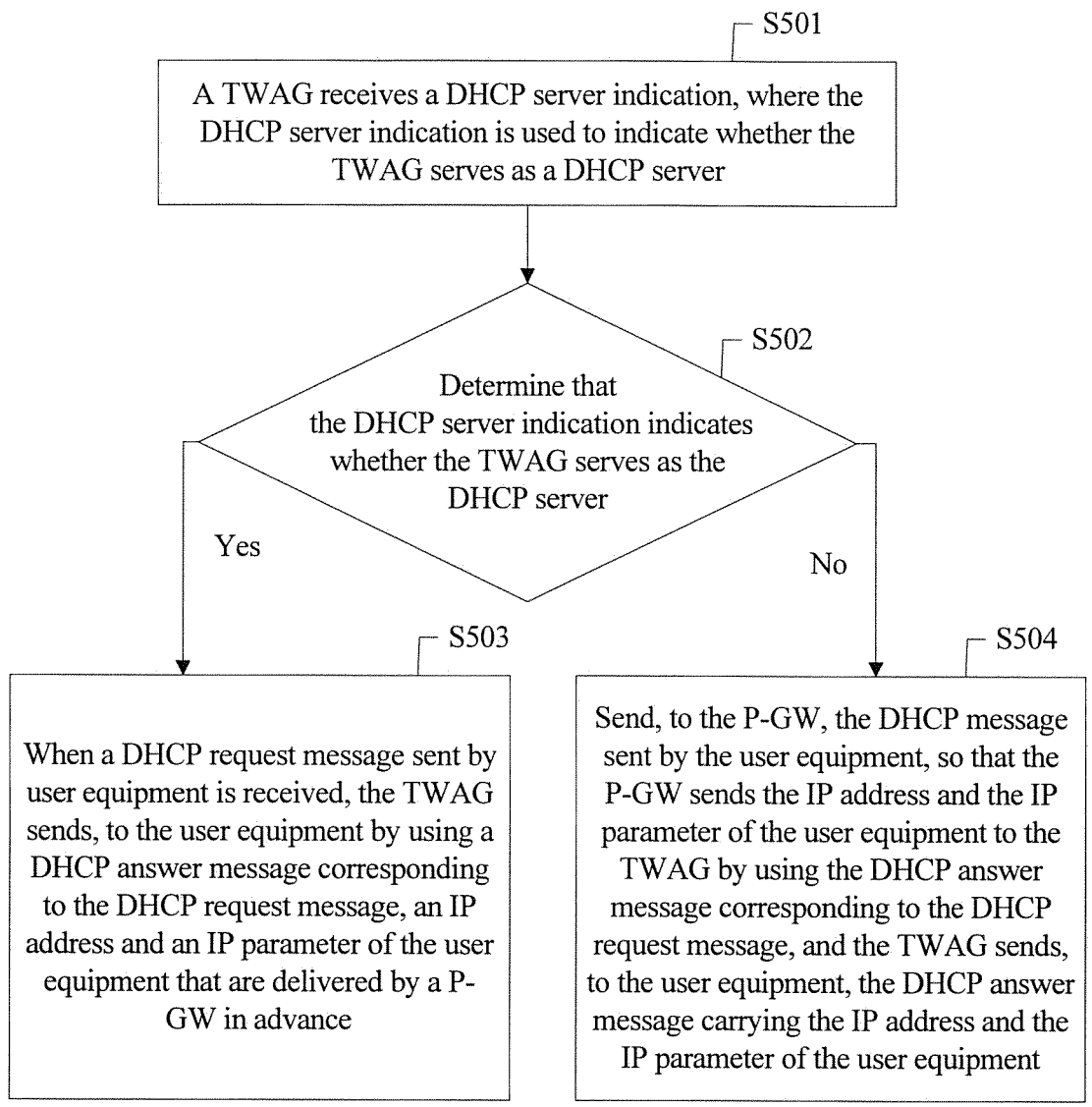
FIG. 5 is a flowchart of a method for allocating an IP address and an IP parameter according to a fifth embodiment of the present invention.

Referring to FIG. 5, FIG. 5 is a flowchart of a method for allocating an IP address and an IP parameter according to a fifth embodiment of the present invention. This embodiment of the present invention may be implemented in a TWAG. As shown in the figure, a procedure in this embodiment includes the following steps: S501-S504.

S501. The TWAG receives a DHCP server indication, where the DHCP server indication is used to indicate whether the TWAG serves as a DHCP server.

S502. The TWAG determines that the DHCP server indication indicates whether the TWAG serves as the DHCP server. If the TWAG serves as the DHCP server, step S503 is executed, and if the TWAG does not serve as the DHCP server, step S504 is executed.

S503. When a DHCP request message sent by user equipment is received, the TWAG sends, to the user equipment by using a DHCP response message corresponding to the DHCP request message, an IP address and an IP parameter of the user equipment that are delivered by a P-GW in advance.

S504. The TWAG sends, to the P-GW, the DHCP message sent by the user equipment, so that the P-GW sends the IP address and the IP parameter of the user equipment to the TWAG by using the DHCP response message corresponding to the DHCP request message, and the TWAG sends, to the user equipment, the DHCP response message carrying the IP address and the IP parameter of the user equipment.

As an optional implementation manner, in step S501, the TWAG receives the DHCP server indication, where the DHCP server indication is used to indicate whether the TWAG serves as the DHCP server. Specifically, the DHCP server indication may include: a parameter that is negotiated among the user equipment, a TWAP, and an AAA server and that indicates whether the TWAG serves as the DHCP server. Further optionally, the TWAG may receive a DHCP server indication sent by the TWAP.

As an optional implementation manner, the DHCP server indication may further include: a parameter that is sent by the user equipment to the TWAG and that is used to indicate whether the TWAG serves as the DHCP server. Specifically, the parameter may include an APN parameter or a PDP parameter. Optionally, the user equipment may send the DHCP server indication to a TWAP, and the TWAP sends the DHCP server indication to the TWAG after receiving the DHCP server indication; or the user equipment directly sends the DHCP server indication to the TWAG.

Further optionally, the PDP parameter may include: an activate PDP context message. Specifically, the user equipment may send the activate PDP context message to the TWAG, so that the TWAG determines, according to the received activate PDP context message, whether the TWAG serves as the DHCP server.

Further optionally, the APN parameter may include an APN message sent by the user equipment to the TWAG, where the APN message indicates which APN is specifically selected by the user equipment. The TWAG determines, according to the received APN message, whether the TWAG serves as the DHCP server.

As an optional implementation manner, in step S502, the TWAG reads the DHCP server indication and determines whether the TWAG serves as the DHCP server.

Further optionally, in step S502, the DHCP server indication may further include: a parameter that is sent by the user equipment to the TWAG and that is used to indicate whether the P-GW serves as the DHCP server, where the parameter may include an APN parameter or a PDP parameter. Specifically, the PDP parameter may include an activate PDP context message, and the APN parameter may include an APN message sent by the user equipment to the P-GW. If the TWAG receives the APN parameter or the PDP parameter sent by the user equipment, it can be determined that the TWAG does not serve as the DHCP server. Therefore, a determining result of S502 is that the TWAG does not serve as the DHCP server, and step S504 continues to be executed.

As an optional implementation manner, in step S503, if the TWAG determines that the TWAG serves as the DHCP server in step S502, when the DHCP request message sent by the user equipment is received, the TWAG acquires the IP address and the IP parameter from a configuration parameter delivered by the P-GW in advance, where the configuration parameter delivered by the P-GW in advance may include: the IP address and an APCO parameter, where the APCO parameter includes the IP parameter. The TWAG sends, to the user equipment, the DHCP response message corresponding to the DHCP request message, where the DHCP response message carries the IP address and the IP parameter that are acquired by the TWAG. The IP address may include: a specific IPv4 address, an IPv6 prefix, and the like. The IP parameter may include: a DNS address, a P-CSCF address, and the like.

As an optional implementation manner, in step S504, if the TWAG determines that the TWAG does not serve as the DHCP server in step S502, the P-GW serves as the DHCP server. The TWAG sends, to the P-GW, the DHCP message sent by the user equipment, so that the P-GW sends the IP address and the IP parameter of the user equipment to the TWAG by using the DHCP response message corresponding to the DHCP request message, and the TWAG sends, to the user equipment, the DHCP response message carrying the IP address and the IP parameter of the user equipment. The IP address may include: a specific IPv4 address, an IPv6 prefix, and the like. The IP parameter may include: a DNS address, a P-CSCF address, and the like.

Further optionally, if the DHCP server indication indicates that the TWAG does not serve as the DHCP server, the TWAG sends a Create Session Request to the P-GW, and the P-GW sends, to the TWAG, a Create Session Response corresponding to the Create Session Request, where the Create Session Response does not carry the IP address and the IP parameter of the user equipment that are allocated by the P-GW. When the user equipment sends the DHCP request message to the TWAG, the TWAG sends the DHCP request message to the P-GW. The P-GW receives the DHCP request message and the P-GW sends, to the TWAG, the DHCP response message corresponding to the DHCP request message, where the DHCP response message carries the IP address and the IP parameter of the user equipment that are allocated by the P-GW. The TWAG receives the DHCP response message, and sends the DHCP response message to the user equipment, where the DHCP response message carries the IP address and the IP parameter of the user equipment that are allocated by the P-GW.

In another embodiment, implementation methods of a DHCP server indication are diverse, which may be a parameter that is negotiated among UE, a TWAP, and an AAA server and that indicates whether a TWAG serves as a DHCP server, or may be a parameter that is sent by the UE to the TWAG and that indicates whether the TWAG serves as the DHCP server, or may be another implementation form, which is not specifically limited in this embodiment.

This embodiment of the present invention provides a method for allocating an IP address and an IP parameter. A TWAG may determine, according to a received DHCP server indication, whether the TWAG serves as a DHCP server, so that specific deployment of the DHCP server may be determined, which resolves a technical problem in the prior art that the TWAG and a P-GW cannot acquire the deployment of the DHCP server, leading to discordance between the TWAG and the P-GW in delivering an IP address and an IP parameter, and causing a problem of incompatibility between the TWAG or the P-GW and UE, so that the user equipment cannot receive the IP address and the IP parameter. Therefore, the P-GW and the TWAG are compatible with the UE, ensuring that the user equipment can receive the IP address and the IP parameter that are allocated by the P-GW, and improving accuracy of allocating the IP address and the IP parameter.

Figure 6:
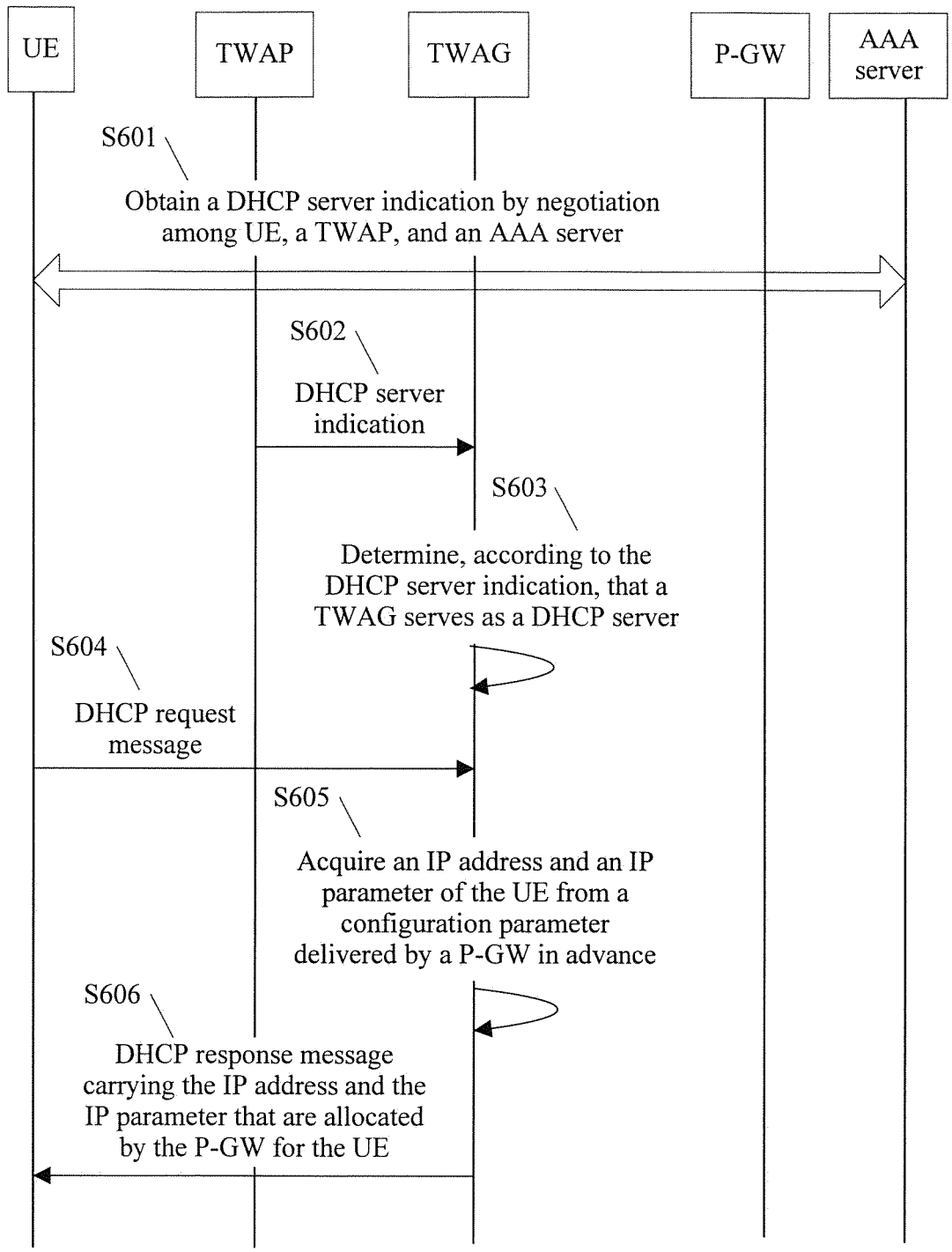
FIG. 6 is a flowchart of a method for allocating an IP address and an IP parameter according to a sixth embodiment of the present invention.

FIG. 6 is a flowchart of a method for allocating an IP address and an IP parameter according to a sixth embodiment of the present invention. As shown in the figure, a procedure in this embodiment includes the following steps: S601-S606.

S601. Obtain a DHCP server indication by negotiation among UE, a TWAP, and an AAA server.

As an optional implementation manner, the DHCP server indication is used to indicate whether a TWAG serves as a DHCP server.

S602. The TWAP sends the DHCP server indication to a TWAG.

S603. The TWAG determines, according to the DHCP server indication, that the TWAG serves as a DHCP server.

S604. The UE sends a DHCP request message to the TWAG.

S605. The TWAG acquires an IP address and an IP parameter of the UE from a configuration parameter delivered by a P-GW in advance.

As an optional implementation manner, the TWAG acquires the IP address and the IP parameter from the configuration parameter delivered by the P-GW in advance, where the configuration parameter delivered by the P-GW in advance may include: the IP address and an APCO parameter, where the APCO parameter includes the IP parameter.

Further optionally, after step S604 and before step S605, or before step S601, the TWAG may send a Create Session Request to the P-GW. After receiving the Create Session Request, the P-GW may send, to the TWAG, a Create Session Response corresponding to the Create Session Request, where the Create Session Response carries the IP address and the APCO parameter of the user equipment that are allocated by the P-GW, where the APCO parameter includes the IP parameter.

S606. The TWAG serves as the DHCP server to return a DHCP response message to the UE, where the DHCP response message carries the IP address and the IP parameter that are allocated by the P-GW for the UE.

As an optional implementation manner, the TWAG serves as the DHCP server, and may directly return the DHCP response message to the UE after receiving the DHCP request message sent by the UE, where the DHCP response message carries the IP address and the IP parameter that are allocated by the P-GW for the UE.

This embodiment of the present invention provides a method for allocating an IP address and an IP parameter. A TWAG may determine, according to a received DHCP server indication, whether the TWAG serves as a DHCP server, so that specific deployment of the DHCP server may be determined. The DHCP server indication indicates that the TWAG serves as the DHCP server, and the TWAG acquires an IP address and an IP parameter of UE from a configuration parameter delivered by a P-GW in advance. When a DHCP request message sent by the UE is received, the TWAG may directly return a DHCP response message to the UE, where the DHCP response message carries the IP address and the IP parameter of the user equipment that are allocated by the P-GW, which resolves a technical problem in the prior art that the TWAG and the P-GW cannot acquire the deployment of the DHCP server, leading to discordance between the TWAG and the P-GW in delivering an IP address and an IP parameter, and causing a problem of incompatibility between the TWAG or the P-GW and the UE, so that the user equipment cannot receive the IP address and the IP parameter. Therefore, the P-GW and the TWAG are compatible with the UE, ensuring that the user equipment can receive the IP address and the IP parameter that are allocated by the P-GW, and improving accuracy of allocating the IP address and the IP parameter.

Figure 7:
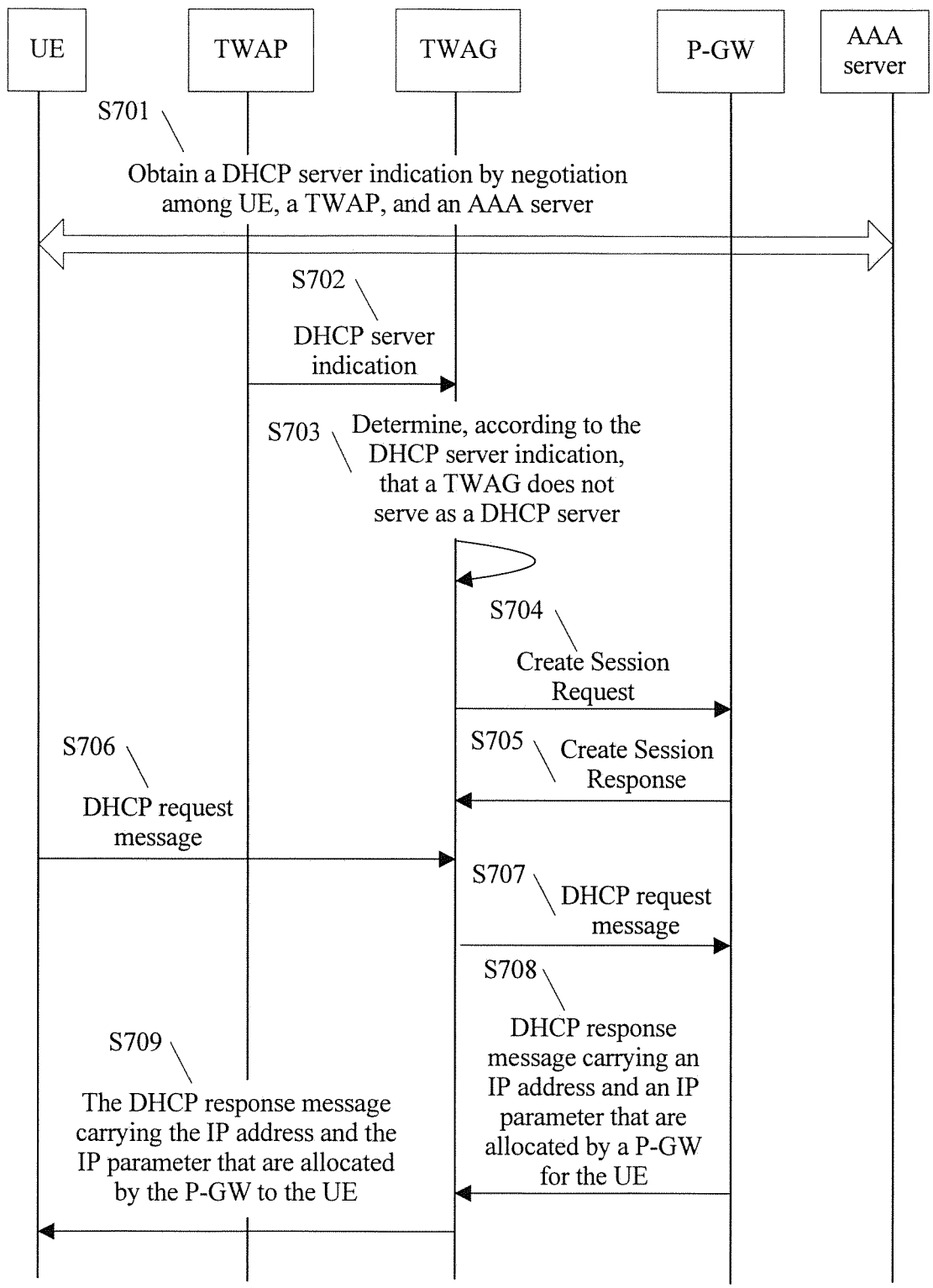
FIG. 7 is a flowchart of a method for allocating an IP address and an IP parameter according to a seventh embodiment of the present invention.

FIG. 7 is a flowchart of a method for allocating an IP address and an IP parameter according to a seventh embodiment of the present invention. As shown in the figure, a procedure in this embodiment includes the following steps: S701-S709.

S701. Obtain a DHCP server indication by negotiation among UE, a TWAP, and an AAA server.

As an optional implementation manner, the DHCP server indication is used to indicate whether a TWAG serves as a DHCP server.

S702. The TWAP sends the DHCP server indication to a TWAG.

S703. The TWAG determines, according to the DHCP server indication, that the TWAG does not serve as a DHCP server.

S704. The TWAG sends a Create Session Request to a P-GW.

S705. The P-GW returns a Create Session Response to the TWAG.

As an optional implementation manner, after receiving the Create Session Request, the P-GW may allocate an all zero IP address for the UE, and send the all zero IP address to the TWAG by using the Create Session Response, that is, the Create Session Response may carry an all zero IP address.

S706. The UE sends a DHCP request message to the TWAG.

S707. The TWAG sends the DHCP request message to the P-GW according to the DHCP server indication.

S708. The P-GW sends a DHCP response message to the TWAG, where the DHCP response message carries an IP address and an IP parameter that are allocated by the P-GW for the UE.

As an optional implementation manner, the IP address may include: a specific IP address, an IP prefix, an address range, or an address set. The IP parameter may include: a DNS address and the like.

S709. The TWAG sends the DHCP response message to the UE, where the DHCP response message carries the IP address and the IP parameter that are allocated by the P-GW for the UE.

This embodiment of the present invention provides a method for allocating an IP address and an IP parameter. A TWAG may determine, according to a received DHCP server indication, whether the TWAG serves as a DHCP server, so that specific deployment of the DHCP server may be determined. The DHCP server indication indicates that the TWAG does not serve as the DHCP server, and therefore a P-GW serves as the DHCP server. When a DHCP request message sent by UE is received, the TWAG sends the DHCP request message to the P-GW, so that the P-GW serves as the DHCP server to deliver a DHCP response message, where the DHCP response message carries an IP address and an IP parameter of the user equipment that are allocated by the P-GW, which resolves a technical problem in the prior art that the TWAG and the P-GW cannot acquire the deployment of the DHCP server, leading to discordance between the TWAG and the P-GW in delivering an IP address and an IP parameter, and causing a problem of incompatibility between the TWAG or the P-GW and the UE, so that the user equipment cannot receive the IP address and the IP parameter. Therefore, the P-GW and the TWAG are compatible with the UE, ensuring that the user equipment can receive the IP address and the IP parameter that are allocated by the P-GW, and improving accuracy of allocating the IP address and the IP parameter.

Figure 8:
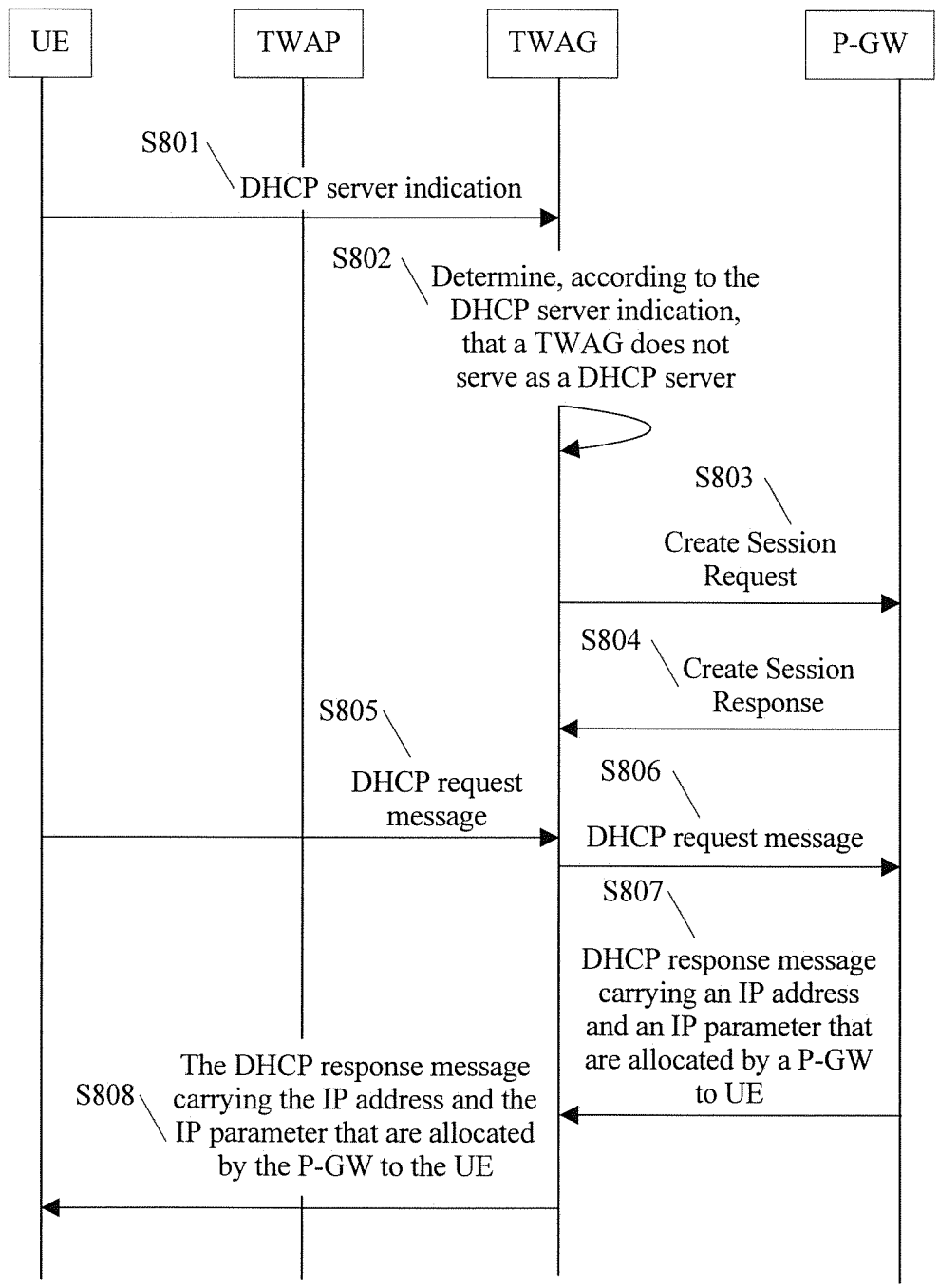
FIG. 8 is a flowchart of a method for allocating an IP address and an IP parameter according to an eighth embodiment of the present invention.

FIG. 8 is a flowchart of a method for allocating an IP address and an IP parameter according to an eighth embodiment of the present invention. As shown in the figure, a procedure in this embodiment includes the following steps: S801-S808.

S801. UE sends a DHCP server indication to a TWAG.

As an optional implementation manner, the DHCP server indication may include: a parameter that is sent by the user equipment to the TWAG and that is used to indicate whether the TWAG serves as a DHCP server. Specifically, the parameter may include an APN parameter or a PDP parameter. Optionally, the user equipment may send the DHCP server indication to a TWAP, and the TWAP sends the DHCP server indication to the TWAG after receiving the DHCP server indication; or the user equipment directly sends the DHCP server indication to the TWAG.

Further optionally, the PDP parameter may include: an activate PDP context message. Specifically, the user equipment may send the activate PDP context message to the TWAG, so that the TWAG determines, according to the received activate PDP context message, whether a P-GW serves as the DHCP server.

Further optionally, the APN parameter may include an APN message sent by the user equipment to the TWAG, where the APN message indicates which APN is specifically selected by the user equipment. The TWAG determines, according to the received APN message, whether the TWAG serves as the DHCP server.

S802. The TWAG determines, according to the DHCP server indication, that the TWAG does not serve as a DHCP server.

As an optional implementation manner, the DHCP server indication may further include: a parameter that is sent by the user equipment to the TWAG and that is used to indicate whether the TWAG serves as the DHCP server, where the parameter may include an APN parameter or a PDP parameter. If the TWAG receives the APN parameter or the PDP parameter sent by the user equipment, it can be determined that the TWAG does not serve as the DHCP server. Specifically, the PDP parameter may include an activate PDP context message, and the APN parameter may include an APN message sent by the user equipment to the TWAG.

S803. The TWAG sends a Create Session Request to a P-GW.

S804. The P-GW returns a Create Session Response to the TWAG.

S805. The UE sends a DHCP request message to the TWAG.

S806. The TWAG sends the DHCP request message to the P-GW according to the DHCP server indication.

S807. The P-GW sends a DHCP response message to the TWAG, where the DHCP response message carries an IP address and an IP parameter that are allocated by the P-GW for the UE.

S808. The TWAG sends the DHCP response message to the UE, where the DHCP response message carries the IP address and the IP parameter that are allocated by the P-GW for the UE.

This embodiment of the present invention provides a method for allocating an IP address and an IP parameter. A TWAG may determine, according to a DHCP server indication sent by UE, that the TWAG does not serve as a DHCP server. When a DHCP request message sent by the UE is received, the TWAG sends the DHCP request message to a P-GW, so that the P-GW serves as the DHCP server to deliver a DHCP response message, where the DHCP response message carries an IP address and an IP parameter of the user equipment that are allocated by the P-GW, which resolves a technical problem in the prior art that the TWAG and the P-GW cannot acquire deployment of the DHCP server, leading to discordance between the TWAG and the P-GW in delivering an IP address and an IP parameter, and causing a problem of incompatibility between the TWAG or the P-GW and the UE, so that the user equipment cannot receive the IP address and the IP parameter. Therefore, the P-GW and the TWAG are compatible with the UE, ensuring that the user equipment can receive the IP address and the IP parameter that are allocated by the P-GW, and improving accuracy of allocating the IP address and the IP parameter.

Figure 9:
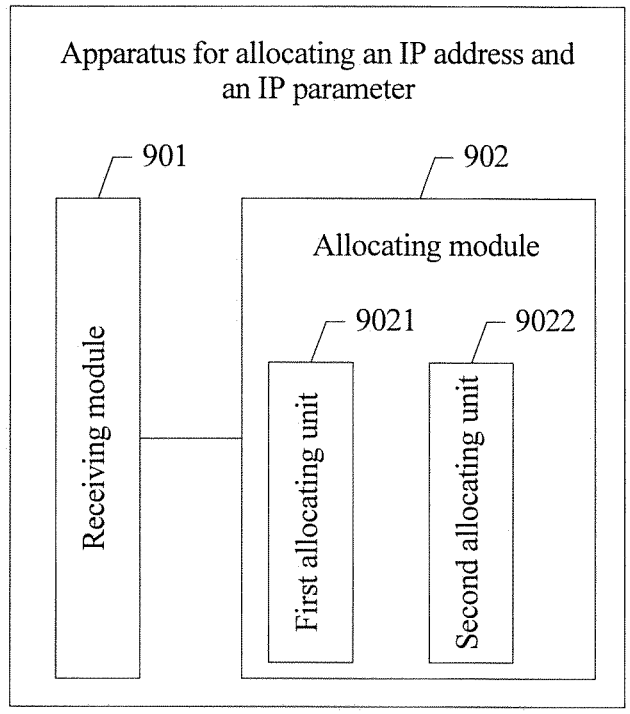
FIG. 9 is a schematic structural diagram of an apparatus for allocating an IP address and an IP parameter according to an embodiment of the present invention.

FIG. 9 is a schematic structural diagram of an apparatus for allocating an IP address and an IP parameter according to an embodiment of the present invention. This embodiment of the present invention may be implemented in a packet data network gateway P-GW. As shown in the figure, the apparatus for allocating an IP address and an IP parameter in this embodiment may include: a receiving module 901 and an allocating module 902.

The receiving module 901 is configured to receive a DHCP server indication sent by a TWAG, where the DHCP server indication is used to indicate whether the P-GW serves as a DHCP server.

The allocating module 902 is configured to allocate an IP address and an IP parameter of user equipment according to the DHCP server indication received by the receiving module 901.

As an optional implementation manner, the receiving module 901 receives the DHCP server indication sent by the TWAG, where the DHCP server indication may include: a parameter that is negotiated among the user equipment, a TWAP, and an AAA server and that indicates whether the P-GW serves as the DHCP server. Specifically, the DHCP server indication may be a parameter sent by the TWAP to the TWAG. The TWAG sends the DHCP server indication to the P-GW, and the P-GW receives the DHCP server indication sent by the TWAG.

Further optionally, a Create Session Request sent by the TWAG to the P-GW may carry the DHCP server indication, so that the TWAG sends the DHCP server indication to the P-GW.

As an optional implementation manner, the DHCP server indication may further include: a parameter that is sent by the user equipment to the TWAG and that is used to indicate whether the P-GW serves as the DHCP server. Specifically, the parameter may include an APN parameter or a PDP parameter. Optionally, the user equipment may send the DHCP server indication to a TWAP, and the TWAP sends the DHCP server indication to the TWAG after receiving the DHCP server indication; or the user equipment directly sends the DHCP server indication to the TWAG.

Further optionally, the PDP parameter may include: an activate PDP context message. Specifically, the user equipment may send the activate PDP context message to the TWAG, so that the TWAG determines, according to the received activate PDP context message, whether the P-GW serves as the DHCP server.

Further optionally, the APN parameter may include an APN message sent by the user equipment to the TWAG, where the APN message indicates which APN is specifically selected by the user equipment. The TWAG determines, according to the received APN message, whether the P-GW serves as the DHCP server.

As an optional implementation manner, the allocating module 902 may allocate the IP address and the IP parameter of the user equipment according to the DHCP server indication received by the receiving module 901. After receiving the DHCP server indication, the P-GW reads the DHCP server indication, and determines whether the P-GW serves as the DHCP server, so as to allocate the IP address and the IP parameter of the user equipment according to the DHCP server indication. The IP address may include: a specific IP address, an IP prefix, an address range, or an address set. The IP parameter may include: a DNS address and the like.

Further optionally, the allocating module 902 may include: a first allocating unit 9021 or a second allocating unit 9022.

The first allocating unit 9021 is configured to: if the DHCP server indication indicates that the P-GW serves as the DHCP server, when a DHCP request message sent by the user equipment is received, send, to the user equipment, a DHCP response message corresponding to the DHCP request message, where the DHCP response message carries the IP address and the IP parameter of the user equipment that are allocated by the P-GW.

The second allocating unit 9022 is configured to: if the DHCP server indication indicates that the P-GW does not serve as the DHCP server, when a Create Session Request sent by the TWAG is received, send, to the TWAG, a Create Session Response corresponding to the Create Session Request, where the Create Session Response carries the IP address and the IP parameter of the user equipment that are allocated by the P-GW, so that the TWAG serves as the DHCP server to send the IP address and the IP parameter to the user equipment.

As an optional implementation manner, the DHCP server indication may further include: a parameter that is sent by the user equipment to the TWAG and that is used to indicate whether the P-GW serves as the DHCP server, where the parameter may include an APN parameter or a PDP parameter. If the TWAG receives the APN parameter or the PDP parameter sent by the user equipment, it can be determined that the P-GW serves as the DHCP server. Specifically, the PDP parameter may include an activate PDP context message, and the APN parameter may include an APN message sent by the user equipment to the P-GW.

Further optionally, the DHCP server indication may further include: a parameter that is sent by the user equipment to the P-GW and that is used to indicate whether the P-GW serves as the DHCP server. Specifically, the parameter may include a PCO parameter. The P-GW receives the PCO parameter sent by the user equipment, and then it can be determined that the P-GW serves as the DHCP server. The P-GW allocates the IP address and the IP parameter of the user equipment according to the DHCP server indication, and adds the IP address and the IP parameter of the user equipment to a DHCP response message, so as to deliver the IP address and the IP parameter of the user equipment to the user equipment.

Further optionally, the TWAG receives a DHCP server indication sent by a TWAP, where the DHCP server indication may include: a parameter that is negotiated among the user equipment, the TWAP, and an AAA server and that indicates whether the P-GW serves as the DHCP server. The TWAG reads the DHCP server indication and controls not to send the DHCP server indication to the P-GW, that is, the TWAG acquires the DHCP server indication, but the P-GW does not acquire the DHCP server indication. Therefore, the TWAG knows whether the P-GW serves as the DHCP server, but the P-GW does not know whether the P-GW serves as the DHCP server.

Further optionally, if the DHCP server indication indicates that the P-GW does not serve as the DHCP server, the TWAG may determine, according to the DHCP server indication, that the P-GW does not serve as the DHCP server, instead the TWAG serves as the DHCP server. If a DHCP request message sent by the user equipment is received, the TWAG acquires the IP address and the IP parameter from a configuration parameter delivered by the P-GW in advance, where the configuration parameter delivered by the P-GW in advance may include: the IP address and an APCO parameter, where the APCO parameter includes the IP parameter. The TWAG sends, to the user equipment, a DHCP response message corresponding to the DHCP request message, where the DHCP response message carries the IP address and the IP parameter that are acquired by the TWAG.

Further optionally, if the DHCP server indication indicates that the P-GW serves as the DHCP server, the TWAG sends a Create Session Request to the P-GW, and the P-GW sends, to the TWAG, a Create Session Response corresponding to the Create Session Request, where the Create Session Response does not carry the IP address and the IP parameter of the user equipment that are allocated by the P-GW. When the user equipment sends the DHCP request message to the TWAG, the TWAG sends the DHCP request message to the P-GW. The P-GW receives the DHCP request message and the P-GW sends, to the TWAG, the DHCP response message corresponding to the DHCP request message, where the DHCP response message carries the IP address and the IP parameter of the user equipment that are allocated by the P-GW. The TWAG receives the DHCP response message, and sends the DHCP response message to the user equipment, where the DHCP response message carries the IP address and the IP parameter of the user equipment that are allocated by the P-GW.

In another embodiment, implementation methods of a DHCP server indication are diverse, which may be a parameter that is negotiated among UE, a TWAP, and an AAA server and that indicates whether a P-GW serves as a DHCP server, or may be a parameter that is sent by the UE to a TWAG and that indicates whether the P-GW serves as the DHCP server, or may be another implementation form, which is not specifically limited in this embodiment.

This embodiment of the present invention provides an apparatus for allocating an IP address and an IP parameter. An allocating module may allocate an IP address and an IP parameter of user equipment according to a DHCP server indication received by a receiving module, where the DHCP server indication is used to indicate whether a P-GW serves as a DHCP server, so that specific deployment of the DHCP server may be determined, which resolves a technical problem in the prior art that a TWAG and the P-GW cannot acquire the deployment of the DHCP server, leading to discordance between the TWAG and the P-GW in delivering an IP address and an IP parameter, and causing a problem of incompatibility between the TWAG or the P-GW and the UE, so that the user equipment cannot receive the IP address and the IP parameter. Therefore, the P-GW and the TWAG are compatible with the UE, ensuring that the user equipment can receive the IP address and the IP parameter that are allocated by the P-GW, and improving accuracy of allocating the IP address and the IP parameter.

It should be noted that the receiving module in this embodiment may be a receiver of the P-GW, and the receiving module and a sending module may be integrated to constitute a transceiver of the P-GW. The allocating module may be a separately disposed processor, or may be implemented by integration into a processor of the P-GW, or may be stored in a memory of the P-GW in a form of program code, and invoked by a processor of the P-GW to execute the foregoing functions of a allocating module. The processor described herein may be a central processing unit (CPU), or an application specific integrated circuit (ASIC), or one or more integrated circuits configured to implement this embodiment of the present invention.

Figure 10:
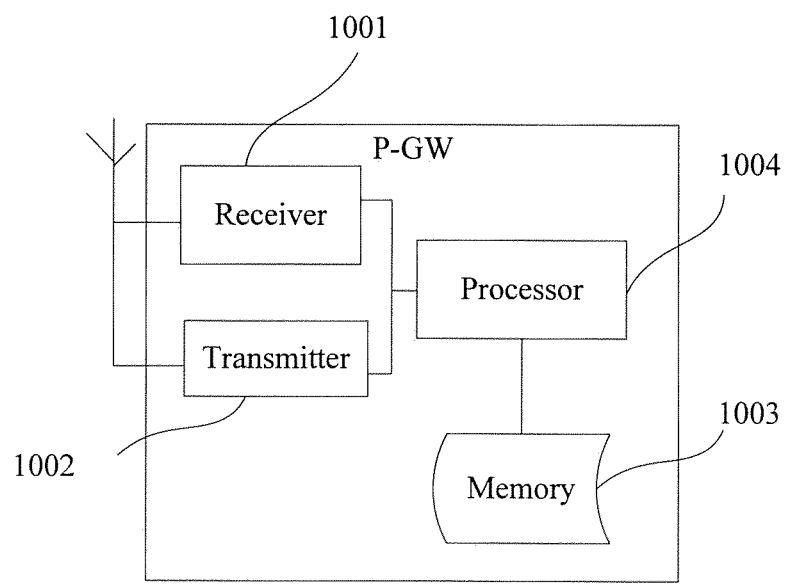
FIG. 10 is a schematic structural diagram of a P-GW according to an embodiment of the present invention.

Referring to FIG. 10, FIG. 10 is a schematic structural diagram of a P-GW according to an embodiment of the present invention, where the P-GW provided in this embodiment corresponds to a method shown in FIG. 1, and the method for allocating an IP address and an IP parameter shown in FIG. 1 is executed by the P-GW. A specific implementation form is shown in FIG. 10. The P-GW in this embodiment of the present invention includes: a receiver 1001, a transmitter 1002, a memory 1003, and a processor 1004, where the receiver 1001, the transmitter 1002, and the memory 1003 are all connected to the processor 1004, for example, may be connected by using a bus. Certainly, the P-GW may further include general components, such as an antenna, a baseband processing component, an intermediate radio frequency processing component, and an input and output apparatus. This embodiment of the present invention sets no limitation thereto.

The receiver 1001 and the transmitter 1002 may be integrated to constitute a transceiver.

The memory 1003 is configured to store executable program code, where the program code includes a computer operation instruction. The memory 1003 may include a high-speed RAM memory, and may also include a non-volatile memory, for example, at least one disk memory.

The processor 1004 may be a central processing unit, or an application specific integrated circuit, or one or more integrated circuits configured to implement this embodiment of the present invention.

The memory 1003 stores a group of program code, and the processor 1004 is configured to invoke the program code stored in the memory 1003 to:

receive, by using the receiver 1001, a DHCP server indication sent by a TWAG, where the DHCP server indication is used to indicate whether the P-GW serves as a DHCP server; and allocate an IP address and an IP parameter of user equipment according to the DHCP server indication.

As an optional implementation manner, the DHCP server indication includes: a parameter that is negotiated among the user equipment, a TWAP, and an AAA server and that indicates whether the P-GW serves as the DHCP server.

As an optional implementation manner, the DHCP server indication includes: a parameter sent by the TWAP to the TWAG.

As an optional implementation manner, the DHCP server indication includes: a parameter that is sent by the user equipment to the TWAG and that is used to indicate whether the P-GW serves as the DHCP server.

As an optional implementation manner, that the processor 1004 allocates the IP address and the IP parameter of the user equipment according to the DHCP server indication specifically includes:

if the DHCP server indication indicates that the P-GW serves as the DHCP server, when a DHCP request message sent by the user equipment is received, sending, by the P-GW to the user equipment, a DHCP response message corresponding to the DHCP request message, where the DHCP response message carries the IP address and the IP parameter of the user equipment that are allocated by the P-GW; or if the DHCP server indication indicates that the P-GW does not serve as the DHCP server, when a Create Session Request sent by the TWAG is received, sending, by the P-GW to the TWAG, a Create Session Response corresponding to the Create Session Request, where the Create Session Response carries the IP address and the IP parameter of the user equipment that are allocated by the P-GW, so that the TWAG serves as the DHCP server to send the IP address and the IP parameter to the user equipment.

In the foregoing technical solution, a P-GW is provided, including a receiver, a transmitter, a memory, and a processor. The processor may allocate an IP address and an IP parameter of user equipment according to a DHCP server indication, where the DHCP server indication is used to indicate whether the P-GW serves as a DHCP server, so that specific deployment of the DHCP server may be determined, which resolves a technical problem in the prior art that a TWAG and the P-GW cannot acquire the deployment of the DHCP server, leading to discordance between the TWAG and the P-GW in delivering an IP address and an IP parameter, and causing a problem of incompatibility between the TWAG or the P-GW and the UE, so that the user equipment cannot receive the IP address and the IP parameter. Therefore, the P-GW and the TWAG are compatible with the UE, ensuring that the user equipment can receive the IP address and the IP parameter that are allocated by the P-GW, and improving accuracy of allocating the IP address and the IP parameter.

Figure 11:
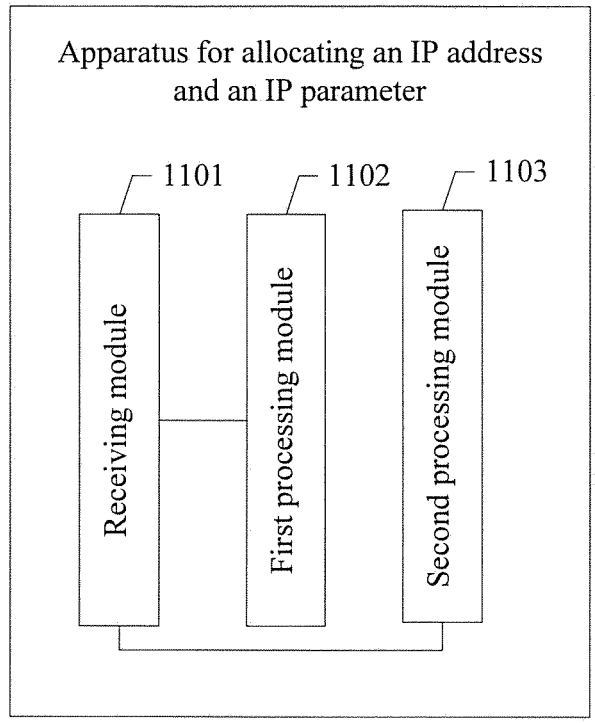
FIG. 11 is a schematic structural diagram of another apparatus for allocating an IP address and an IP parameter according to an embodiment of the present invention.

FIG. 11 is a schematic structural diagram of another apparatus for allocating an IP address and an IP parameter according to an embodiment of the present invention. This embodiment of the present invention may be implemented in a TWAG. As shown in the figure, the apparatus for allocating an IP address and an IP parameter in this embodiment may include: a receiving module 1101, a first processing module 1102, and a second processing module 1103.

The receiving module 1101 is configured to receive a DHCP server indication, where the DHCP server indication is used to indicate whether the TWAG serves as a DHCP server.

The first processing module 1102 is configured to: if the DHCP server indication indicates that the TWAG serves as the DHCP server, when a DHCP request message sent by user equipment is received, send, to the user equipment by using a DHCP response message corresponding to the DHCP request message, an IP address and an IP parameter of the user equipment that are delivered by a P-GW in advance.

The second processing module 1103 is configured to: if the DHCP server indication indicates that the TWAG does not serve as the DHCP server, send, to the P-GW, the DHCP message sent by the user equipment, so that the P-GW sends the IP address and the IP parameter of the user equipment to the TWAG by using the DHCP response message corresponding to the DHCP request message, and the TWAG sends, to the user equipment, the DHCP response message carrying the IP address and the IP parameter of the user equipment.

As an optional implementation manner, the receiving module 1101 receives the DHCP server indication, where the DHCP server indication is used to indicate whether the TWAG serves as the DHCP server. Specifically, the DHCP server indication may include: a parameter that is negotiated among the user equipment, a TWAP, and an AAA server and that indicates whether the TWAG serves as the DHCP server. Further optionally, the TWAG may receive a DHCP server indication sent by the TWAP.

As an optional implementation manner, the DHCP server indication may further include: a parameter that is sent by the user equipment to the TWAG and that is used to indicate whether the TWAG serves as the DHCP server. Specifically, the parameter may include an APN parameter or a PDP parameter. Optionally, the user equipment may send the DHCP server indication to a TWAP, and the TWAP sends the DHCP server indication to the TWAG after receiving the DHCP server indication; or the user equipment directly sends the DHCP server indication to the TWAG.

Further optionally, the PDP parameter may include: an activate PDP context message. Specifically, the user equipment may send the activate PDP context message to the TWAG, so that the TWAG determines, according to the received activate PDP context message, whether the TWAG serves as the DHCP server.

Further optionally, the APN parameter may include an APN message sent by the user equipment to the TWAG, where the APN message indicates which APN is specifically selected by the user equipment. The TWAG determines, according to the received APN message, whether the TWAG serves as the DHCP server.

As an optional implementation manner, the first processing module 1102 reads the DHCP server indication, and determines that the TWAG serves as the DHCP server. When the DHCP request message sent by the user equipment is received, the TWAG acquires the IP address and the IP parameter from a configuration parameter delivered by the P-GW in advance, where the configuration parameter delivered by the P-GW in advance may include: the IP address and an APCO parameter, where the APCO parameter includes the IP parameter. The TWAG sends, to the user equipment, the DHCP response message corresponding to the DHCP request message, where the DHCP response message carries the IP address and the IP parameter that are acquired by the TWAG.

As an optional implementation manner, the second processing module 1103 reads the DHCP server indication and determines that the TWAG does not serve as the DHCP server. Further optionally, the DHCP server indication may further include: a parameter that is sent by the user equipment to the TWAG and that is used to indicate whether the P-GW serves as the DHCP server, where the parameter may include an APN parameter or a PDP parameter. Specifically, the PDP parameter may include an activate PDP context message, and the APN parameter may include an APN message sent by the user equipment to the P-GW. If the TWAG receives the APN parameter or the PDP parameter sent by the user equipment, it can be determined that the TWAG does not serve as the DHCP server.

As an optional implementation manner, the second processing module 1103 reads the DHCP server indication, determines that the TWAG does not serve as the DHCP server, and sends, to the P-GW, the DHCP message sent by the user equipment, so that the P-GW sends the IP address and the IP parameter of the user equipment to the TWAG by using the DHCP response message corresponding to the DHCP request message, and the TWAG sends, to the user equipment, the DHCP response message carrying the IP address and the IP parameter of the user equipment.

Further optionally, if the DHCP server indication indicates that the TWAG does not serve as the DHCP server, the second processing module 1103 sends a Create Session Request to the P-GW, and the P-GW sends, to the TWAG, a Create Session Response corresponding to the Create Session Request, where the Create Session Response does not carry the IP address and the IP parameter of the user equipment that are allocated by the P-GW. When the user equipment sends the DHCP request message to the TWAG, the TWAG sends the DHCP request message to the P-GW.

The P-GW receives the DHCP request message and the P-GW sends, to the TWAG, the DHCP response message corresponding to the DHCP request message, where the DHCP response message carries the IP address and the IP parameter of the user equipment that are allocated by the P-GW. The TWAG receives the DHCP response message, and sends the DHCP response message to the user equipment, where the DHCP response message carries the IP address and the IP parameter of the user equipment that are allocated by the P-GW.

In another embodiment, implementation methods of a DHCP server indication are diverse, which may be a parameter that is negotiated among UE, a TWAP, and an AAA server and that indicates whether a TWAG serves as a DHCP server, or may be a parameter that is sent by the UE to the TWAG and that indicates whether the TWAG serves as the DHCP server, or may be another implementation form, which is not specifically limited in this embodiment.

This embodiment of the present invention provides an apparatus for allocating an IP address and an IP parameter. It can be determined, according to a DHCP server indication received by a receiving module, whether a TWAG serves as a DHCP server, so that specific deployment of the DHCP server may be determined, which resolves a technical problem in the prior art that the TWAG and a P-GW cannot acquire the deployment of the DHCP server, leading to discordance between the TWAG and the P-GW in delivering an IP address and an IP parameter, and causing a problem of incompatibility between the TWAG or the P-GW and UE, so that the user equipment cannot receive the IP address and the IP parameter. Therefore, the P-GW and the TWAG are compatible with the UE, ensuring that the user equipment can receive an IP address and an IP parameter that are allocated by the P-GW, and improving accuracy of allocating the IP address and the IP parameter.

It should be noted that the receiving module in this embodiment may be a receiver of the TWAG, and the receiving module and a sending module may be integrated to constitute a transceiver of the TWAG. The first processing module and the second processing module may be separately disposed processors, or may be implemented by integration into a processor of the TWAG, or may be stored in a memory of the TWAG in a form of program code, and invoked by a processor of the TWAG to execute the foregoing functions of the first processing module and the second processing module. The processor described herein may be a central processing unit CPU, or an application specific integrated circuit ASIC, or one or more integrated circuits configured to implement this embodiment of the present invention.

Figure 12:
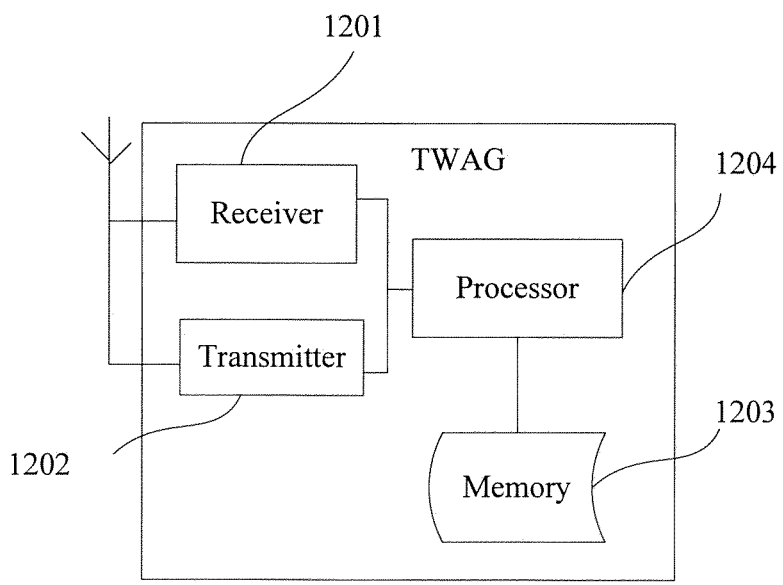
FIG. 12 is a schematic structural diagram of a TWAG according to an embodiment of the present invention.

Referring to FIG. 12, FIG. 12 is a schematic structural diagram of a TWAG according to an embodiment of the present invention, where the TWAG provided in this embodiment corresponds to the method shown in FIG. 5, and the method for allocating an IP address and an IP parameter shown in FIG. 5 is executed by the TWAG. A specific implementation form is shown in FIG. 12. The TWAG in this embodiment of the present invention includes: a receiver 1201, a transmitter 1202, a memory 1203, and a processor 1204, where the receiver 1201, the transmitter 1202, and the memory 1203 are all connected to the processor 1204, for example, may be connected by using a bus. Certainly, the TWAG may further include general components, such as an antenna, a baseband processing component, an intermediate radio frequency processing component, and an input and output apparatus. This embodiment of the present invention sets no limitation thereto.

The receiver 1201 and the transmitter 1202 may be integrated to constitute a transceiver.

The memory 1203 is configured to store executable program code, where the program code includes a computer operation instruction. The memory 1203 may include a high-speed RAM memory, and may also include a non-volatile memory, for example, at least one disk memory.

The processor 1204 may be a central processing unit, or an application specific integrated circuit, or one or more integrated circuits configured to implement this embodiment of the present invention.

The memory 1203 stores a group of program code, and the processor 1204 is configured to invoke the program code stored in the memory 1003 to:

receive a DHCP server indication by using the receive 1201, where the DHCP server indication is used to indicate whether the TWAG serves as a DHCP server;

if the DHCP server indication indicates that the TWAG serves as the DHCP server, when a DHCP request message sent by the user equipment is received, send, by the TWAG to the user equipment by using a DHCP response message corresponding to the DHCP request message, an IP address and an IP parameter of the user equipment that are delivered by a P-GW in advance; and if the DHCP server indication indicates that the TWAG does not serve as the DHCP server, send, by the TWAG to the P-GW, the DHCP message sent by the user equipment, so that the P-GW sends the IP address and the IP parameter of the user equipment to the TWAG by using the DHCP response message corresponding to the DHCP request message, and the TWAG sends, to the user equipment, the DHCP response message carrying the IP address and the IP parameter of the user equipment.

As an optional implementation manner, the DHCP server indication includes: a parameter that is negotiated among the user equipment, a TWAP, and an AAA server and that indicates whether the TWAG serves as the DHCP server.

As an optional implementation manner, that the receiver 1201 receives the DHCP server indication is specifically: receiving a DHCP server indication sent by the TWAP.

As an optional implementation manner, the DHCP server indication includes: a parameter that is sent by the user equipment to the TWAG and that is used to indicate whether the TWAG serves as the DHCP server.

In the foregoing technical solution, a TWAG is provided, including a receiver, a transmitter, a memory, and a processor. The processor may determine, according to a DHCP server indication received by the receiver, whether the TWAG serves as a DHCP server, so that specific deployment of the DHCP server may be determined, which resolves a technical problem in the prior art that the TWAG and a P-GW cannot acquire the deployment of the DHCP server, leading to discordance between the TWAG and the P-GW in delivering an IP address and an IP parameter, and causing a problem of incompatibility between the TWAG or the P-GW and UE, so that the user equipment cannot receive the IP address and the IP parameter. Therefore, the P-GW and the TWAG are compatible with the UE, ensuring that the user equipment can receive an IP address and an IP parameter that are allocated by the P-GW, and improving accuracy of allocating the IP address and the IP parameter.

Figure 13:
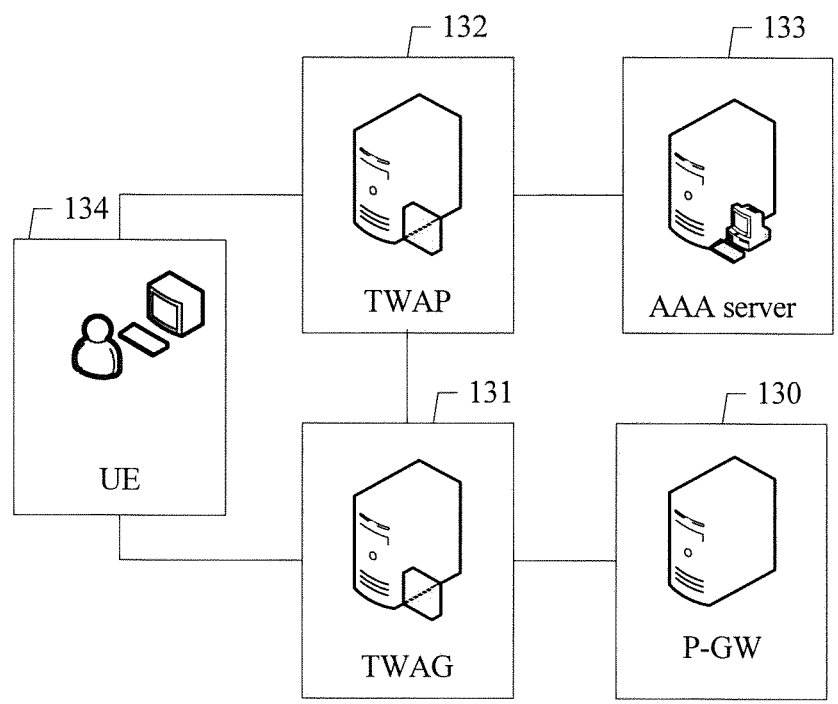
FIG. 13 is a schematic structural diagram of a system for allocating an IP address and an IP parameter according to an embodiment of the present invention.

As shown in FIG. 13, FIG. 13 is a schematic structural diagram of a system for allocating an IP address and an IP parameter according to an embodiment of the present invention. As shown in the figure, the system includes a P-GW (130) and a TWAG (131).

As an optional implementation manner, the P-GW (130) is the apparatus shown in FIG. 9, and the TWAG (131) is the apparatus shown in FIG. 11. The P-GW (130) and the TWAG (131) may be connected by using a wireless network. For structures and functions of the apparatuses, reference may be made to related description of embodiments shown in FIG. 9 and FIG. 11, which is not described herein again. Further optionally, the system may further include: user equipment UE (134), a TWAP (132), and an AAA server (133).

It should be noted that the system in this embodiment may be applied to the foregoing methods.

In conclusion, the embodiments of the present invention provide a method, an apparatus, and a system for allocating an IP address and an IP parameter. A P-GW or a TWAG may determine deployment of DHCP according to a received DHCP server indication, so as to allocate an IP address and an IP parameter of user equipment, where the DHCP server indication is used to indicate whether the P-GW serves as a DHCP server, so that specific deployment of the DHCP server may be determined, which resolves a technical problem in the prior art that the TWAG and the P-GW cannot acquire the deployment of the DHCP server, leading to discordance between the TWAG and the P-GW in delivering an IP address and an IP parameter, and causing a problem of incompatibility between the TWAG or the P-GW and the UE, so that the user equipment cannot receive the IP address and the IP parameter. Therefore, the P-GW and the TWAG are compatible with the UE, ensuring that the user equipment can receive an IP address and an IP parameter that are allocated by the P-GW, and improving accuracy of allocating the IP address and the IP parameter.

With descriptions of the foregoing embodiments, a person skilled in the art may clearly understand that the present invention may be implemented by using hardware, firmware or a combination thereof. When the present invention is implemented by using software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in definition of a medium to which they belong. For example, a disk and disc used by the present invention includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

What is disclosed above is merely embodiments of the present invention, and certainly is not intended to limit the protection scope of the present invention. Therefore, equivalent variations made in accordance with the claims of the present invention shall fall within the scope of the present invention.

What is claimed is:

1. A method, carried out by a packet data network gateway (P-GW) and a Trusted WLAN Access Gateway (TWAG), for allocating an Internet Protocol (IP) parameter, the method comprising:
  receiving by the P-GW, a dynamic host configuration protocol (DHCP) server indication sent by a trusted wireless local area network (WLAN) authentication authorization accounting (AAA) proxy (TWAP), wherein the DHCP server indication indicates one of the group consisting of:
    a first possible indication indicating the P-GW serves as the DHCP server, and
    a second possible indication indicating the TWAG serves as the DHCP server;
  determining, based upon the DHCP server indication, the DHCP server taken from the group consisting of: the P-GW and the TWAG;
  the method further comprising:
  upon determining the P-GW serves as the DHCP server, a DHCP request message is received, by the TWAG, from a user equipment, and forwarded to the P-GW; and
  sending, after the determining the P-GW serves as the DHCP server, a message carrying an IP parameter of a user equipment (UE),
    wherein the sending comprises sending, by the P-GW to the TWAG based upon determining the P-GW serves as the DHCP server, a DHCP response message corresponding to the DHCP request message, and
    wherein the sending further comprises forwarding, by the TWAG to the user equipment, the DHCP response message, wherein the DHCP response message carries the IP parameter of the user equipment that is allocated by the P-GW; and
  upon determining the TWAG serves as the DHCP server, a create session request sent by the TWAG to the P-GW is received, and
    sending, after the determining the TWAG serves as the DHCP server, a message carrying the IP parameter of the user equipment,
    wherein the sending comprises sending, by the PGW to the TWAG based upon determining the TWAG serves as the DHCP server, a create session response corresponding to the create session request,
    wherein the create session response carries the IP parameter of the user equipment that is allocated by the P-GW, and
    wherein the create session response causes the TWAG to respond to a DHCP request message from the UE without consulting the P-GW, the response carrying the IP parameter for the user equipment.

2. The method according to claim 1, wherein the DHCP server indication comprises:
  a parameter negotiated among the UE, the TWAP, and an AAA server and that indicates whether the P-GW serves as the DHCP server.

3. The method according to claim 1, wherein the DHCP server indication comprises:
a parameter sent from the UE to the TWAG and that indicates whether the P-GW serves as the DHCP server.

4. The method according to claim 1, wherein the parameter comprises a Packet Data Protocol (PDP) parameter or a protocol configuration options (PCO) parameter.

5. An apparatus for allocating an Internet Protocol (IP) parameter, wherein the apparatus comprises:
a receiver,
a transmitter,
a processor, and
a non-transitory computer-readable medium including computer-executable instructions that, when executed by the processor, facilitate performing a method for allocating the IP parameter comprising:
receiving, by the receiver cooperatively operating with the processor, a dynamic host configuration protocol (DHCP) server indication sent by a trusted wireless local area network (WLAN) authentication authorization accounting (AAA) proxy (TWAP), wherein the DHCP server indication indicates one of the group consisting of:
a first possible indication indicating the P-GW serves as the DHCP server, and
a second possible indication indicating the TWAG serves as the DHCP server;
determining, based upon the DHCP server indication, the DHCP server taken from the group consisting of: the P-GW and the TWAG; and
sending, by the transmitter cooperatively operating with the processor after the determining, a message carrying an IP parameter of a user equipment (UE),
wherein:
upon determining the P-GW serves as the DHCP server, a DHCP request message is received, by the TWAG, from a user equipment, and forwarded to the P-GW; and
sending, after the determining the P-GW serves as the DHCP server, a message carrying an IP parameter of a user equipment (UE),
wherein the sending comprises sending, by the P-GW to the TWAG based upon determining the P-GW serves as the DHCP server, a DHCP response message corresponding to the DHCP request message, and
wherein the sending further comprises forwarding, by the TWAG to the user equipment, the DHCP response message, wherein the DHCP response message carries the IP parameter of the user equipment that is allocated by the P-GW; and
upon determining the TWAG serves as the DHCP server, a create session request sent by the TWAG to the P-GW is received, and
sending, after the determining the TWAG serves as the DHCP server, a message carrying the IP parameter of the user equipment,
wherein the sending comprises sending, by the PGW to the TWAG based upon determining the TWAG serves as the DHCP server, a create session response corresponding to the create session request,
wherein the create session response carries the IP parameter of the user equipment that is allocated by the P-GW, and
wherein the create session response causes the TWAG to respond to a DHCP request message from the UE without consulting the P-GW, the response carrying the IP parameter for the user equipment.

6. The apparatus according to claim 5, wherein the DHCP server indication comprises:
a parameter negotiated among the UE, the TWAP, and an AAA server and that indicates whether the P-GW serves as the DHCP server.

7. The apparatus according to claim 5, wherein the DHCP server indication comprises:
a parameter sent from the UE to the TWAG and that indicates whether the P-GW serves as the DHCP server.

8. The method according to claim 4, wherein the PDP parameter comprises an activate PDP context message.

* * * * *

UNITED STATES PATENT AND TRADEMARK OFFICE
CERTIFICATE OF CORRECTION

PATENT NO. : 10,873,561 B2  
APPLICATION NO. : 15/136421  
DATED : December 22, 2020  
INVENTOR(S) : Liu et al.

It is certified that error appears in the above-identified patent and that said Letters Patent is hereby corrected as shown below:

In the Claims

Claim 1: Column 26, Line 16: "receiving by the P-GW, a dynamic host configuration" should read -- receiving, by the P-GW, a dynamic host configuration --.

Signed and Sealed this
Twenty-ninth Day of March, 2022

Drew Hirshfeld
*Performing the Functions and Duties of the
Under Secretary of Commerce for Intellectual Property and
Director of the United States Patent and Trademark Office*